(12) United States Patent
Tuchiya

(10) Patent No.: US 7,107,603 B2
(45) Date of Patent: Sep. 12, 2006

(54) DISK DEVICE WITH CLAMP MECHANISM, ATTITUDE SET-UP MEMBER AND CONVEYING MECHANISM

(75) Inventor: Tatuhiko Tuchiya, Iwaki (JP)

(73) Assignee: Alpine Electronics, Inc., Tokyo (JP)

( * ) Notice: Subject to any disclaimer, the term of this patent is extended or adjusted under 35 U.S.C. 154(b) by 469 days.

(21) Appl. No.: 10/674,291

(22) Filed: Sep. 29, 2003

(65) Prior Publication Data

US 2004/0117808 A1 Jun. 17, 2004

(30) Foreign Application Priority Data

Sep. 30, 2002 (JP) ............................. 2002-285668

(51) Int. Cl.
*G11B 17/043* (2006.01)
*G11B 19/20* (2006.01)

(52) U.S. Cl. ...................................... 720/713; 720/624

(58) Field of Classification Search ................ 720/661, 720/713, 624, 662, 698, 703, 706
See application file for complete search history.

(56) References Cited

U.S. PATENT DOCUMENTS

| 4,216,510 | A | * | 8/1980 | Manzke et al. | .......... | 360/99.05 |
| 4,628,498 | A | * | 12/1986 | Takamatsu et al. | ......... | 720/624 |
| 5,084,854 | A | * | 1/1992 | Ikedo et al. | ................. | 720/613 |
| 5,084,855 | A | * | 1/1992 | Kobayashi et al. | ......... | 720/647 |
| 2003/0090984 | A1 | * | 5/2003 | Lee et al. | .................. | 369/77.1 |

FOREIGN PATENT DOCUMENTS

JP 2001-331997 11/2001

* cited by examiner

*Primary Examiner*—Julie Anne Watko
(74) *Attorney, Agent, or Firm*—Brinks Hofer Gilson & Lione

(57) ABSTRACT

A disk device according to the present invention includes a mechanism unit having a rotational drive unit for driving a disk, a clamp mechanism for clamping the disk to the rotational drive unit, and a conveying mechanism for conveying the disk toward the rotational drive unit. The mechanism unit further includes an attitude set-up member, which is directly connected to the clamp mechanism and the conveying mechanism and rotates about an axis parallel to the surface of the disk mounted in the mechanism unit, and a drive mechanism for applying a rotational force to the attitude set-up member. When the attitude set-up member rotates in a predetermined direction, the clamp mechanism is operated to cancel the clamping of the disk, and the conveying mechanism is set to be able to convey the disk by the rotational force of the attitude set-up member. When the attitude set-up member rotates in a direction opposite to the predetermined direction, the clamp mechanism is set to clamp the disk, and the conveying mechanism is set not to apply a conveying force to the disk by the rotational force of the attitude set-up member. Thereby, the load for driving the clamp mechanism and the conveying mechanism can be reduced and these mechanisms can be timely operated.

23 Claims, 19 Drawing Sheets

DISK DEVICE WITH CLAMP MECHANISM, ATTITUDE SET-UP MEMBER AND CONVEYING MECHANISM

BACKGROUND OF THE INVENTION

1. Field of the Invention

The present invention relates to a disk device having a disk rotational drive unit and a disk conveying mechanism, and in particular relates to a disk device capable of switching between a clamp mechanism for clamping a disk to the rotational drive unit and a conveying mechanism.

2. Description of the Related Art

A vehicle-mounted disk device includes a disk rotational drive unit, a clamp mechanism for clamping a disk to the rotational drive unit, and a conveying mechanism for feeding the disk to the rotational drive unit, as a mechanism unit. Also, it is necessary to switch the transmission of a conveying force for the disk between the clamping operation of the clamp mechanism and the releasing operation of the clamp mechanism.

The mechanism unit is supported by an elastic member, such as a damper, so as to prevent vehicle vibrations from being directly transmitted to the rotational-drive unit, preventing sound skipping during the disk driving. Moreover, it is necessary to restrict the mechanism unit from moving when the disk is fed to the rotational drive unit and when the disk is discharged from the rotational drive unit. Therefore, a conventional disk apparatus is provided with a pair of sliding plates disposed at both ends of the chassis for linearly reciprocating, so that by the moving force of the sliding plates, the operations of clamping or unclamping the disk to or from the rotational drive unit, bringing a roller constituting the conveying mechanism in contact or out of contact with the disk, and locking the mechanism unit are performed.

Japanese Unexamined Patent Application Publication No. 2001-331997 discloses a disk player that includes a lock arm rotating about a shaft aligned in parallel with a surface of a disk as a fulcrum and a link plate for rotating the lock arm, which are disposed in a floating section. In the disk player, the lock arm rotates so as to be retained at both ends to a case, so that the floating section becomes locked to the case. The rotating operation of the lock arm reciprocates a loading roller between a position where the loading roller contacts the disk and a position where it is separated from the disk. Furthermore, a clamp-bar arm plate is operated by a linearly moving force of the link plate for clamping the disk and unclamping the disk.

However, since a conventional disk device having a linearly moving slide plate operates a clamping mechanism and an arm by sliding an inclined cam fabricated on the slide plate on the arm supporting the clamping mechanism and conveying rollers, the load for sliding the slide plate is significantly large. Also, locking a mechanism unit using this slide plate increases the load when the slide plate is further operated.

In general, the inclined cam is coated with grease so as to reduce a sliding frictional-resistance; however, because of the temperature dependency of the grease, the load largely increases at low temperature, for example. Also, at high temperature, there is a problem that the grease runs off the inclined cam, so that the device is difficult to be operated at a low load for a long period.

In the above-mentioned Japanese Unexamined Patent Application Publication No. 2001-331997, the transfer rollers are moved up and down by the rotational force of the lock arm while a damper arm-plate is moved up and down by the sliding force of the linearly operating link plate. Therefore, the sliding load of the damper arm-plate for clamping the disk and unclamping the disk is large, and it is also difficult to establish the timing of the up and down movement of the transfer rollers and the clamping/unclamping of the damper arm-plate.

SUMMARY OF THE INVENTION

In order to solve the above-mentioned problems, the present invention has been made, and it is an object thereof to provide a disk device capable of switching the operations of a clamping mechanism and a transfer mechanism at a low load and timely as well, and further capable of locking a mechanism unit.

A disk device according to the present invention includes a mechanism unit comprising a rotational drive unit for driving a disk; a clamp mechanism for clamping the disk to the rotational drive unit; and a conveying mechanism for conveying the disk toward the rotational drive unit, wherein the mechanism unit comprises an attitude set-up member, which is directly connected to the clamp mechanism and the conveying mechanism and rotates about an axis parallel to the surface of the disk mounted in the mechanism unit, and a drive mechanism for applying a rotational force to the attitude set-up member, wherein when the attitude set-up member rotates in a predetermined direction, the clamp mechanism is operated to cancel the clamping of the disk, and the conveying mechanism is set to be able to convey the disk by the rotational force of the attitude set-up member, and wherein when the attitude set-up member rotates in a direction opposite to the predetermined direction, the clamp mechanism is set to clamp the disk, and the conveying mechanism is set to not apply a conveying force to the disk by the rotational force of the attitude set-up member.

In this disk device, the states of the clamp mechanism and the conveying mechanism are switched by linking them to the attitude set-up member. Since this switching is performed based on the rotational operation of the attitude set-up member, the usual linear movement unit and sliding unit are not necessary, thereby reducing a sliding frictional resistance. Also, the clamp mechanism and the conveying mechanism are directly connected to the attitude set-up member, respectively, so as to link to each other with the attitude set-up member therebetween, thereby securely linking the switching timings of the clamp mechanism and the conveying mechanism.

Preferably, one side of the attitude set-up member with the rotational center therebetween is directly connected to the clamp mechanism and the other side is directly connected to the conveying mechanism.

The timings of the clamp mechanism and the conveying mechanism are opposite to each other, wherein when the clamp mechanism is the clamping state, the conveying mechanism is in the state of not transmitting the conveying force to the disk, while when the clamp mechanism is the unclamping state, the conveying mechanism is switched to the state of transmitting the conveying force to the disk. Therefore, one side of the attitude set-up member is connected to the clamp mechanism with the rotational center therebetween while the other is connected to the conveying mechanism, and the operational timings of the clamp mechanism and the conveying mechanism can thereby be securely synchronized by the rotation of the attitude set-up member.

According to the present invention, attitude set-up members may be provided on both sides of the mechanism unit, and both of the attitude set-up members may be connected together with the clamp mechanism therebetween. Thereby, the operations of the attitude set-up members can be synchronized without using a specific member for connecting both of the attitude set-up members.

If the conveying mechanism is driven by the power of a motor for driving the drive mechanism, the cost can be reduced because of sharing the motor.

The conveying mechanism includes a roller and an arm for supporting the roller, for example, wherein the arm is rotated by the attitude set-up member so that the roller is moved to a position where the roller contacts the disk or a position where the roller is separated from the disk.

Also, the clamp mechanism may include a clamp chassis for rotational operation, wherein by the power of the drive mechanism, the clamp chassis may be rotationally driven while the attitude set-up member may be rotated by the rotational force of the clamp chassis. In this case, the clamp chassis may be provided with a clamp arm arranged rotatably and having a damper rotatably attached to the clamp arm for clamping the disk to the rotational drive unit, wherein the clamp arm may rotate in the clamping/unclamping directions along with the rotation of the clamp chassis.

The attitude set-up member may be directly rotated by the power of the motor, and this power may be transmitted to the clamp mechanism and the conveying mechanism through the attitude set-up member.

Furthermore, according to the present invention, the mechanism unit preferably is supported within an external chassis by an elastic support member therebetween, and when the attitude set-up member rotates in the predetermined direction, by the abutment of the attitude set-up member to the external chassis, the movement of the mechanism unit is restricted so as not to move within the external chassis, while when the attitude set-up member rotates in a direction opposite to the predetermined direction, the attitude set-up member is separated from the external chassis, so that the mechanism unit is elastically supported by the elastic support member within the external chassis.

By such a structure, the operations of the clamp mechanism and the conveying mechanism and the locking/unlocking operations of the mechanism unit can be synchronized.

In this case, when the attitude set-up member rotates in the predetermined direction, the clamp mechanism may abut the external chassis at a position different from the position where the attitude set-up member abuts, enabling the mechanism unit to be stably locked within the external chassis.

DESCRIPTION OF THE PREFERRED EMBODIMENTS

A disk device 1 according to the present invention can load a disk D such as a CD (compact disk) or a DVD (digital versatile disk). This disk device 1 is accommodated within a casing (not shown) with a size of one DIN. On the front surface of the casing, there is provided a face section (not shown) having a liquid crystal display panel and various switches, and the face section is provided with a slit loading slot extending in the width direction (X-direction).

Figure 1:
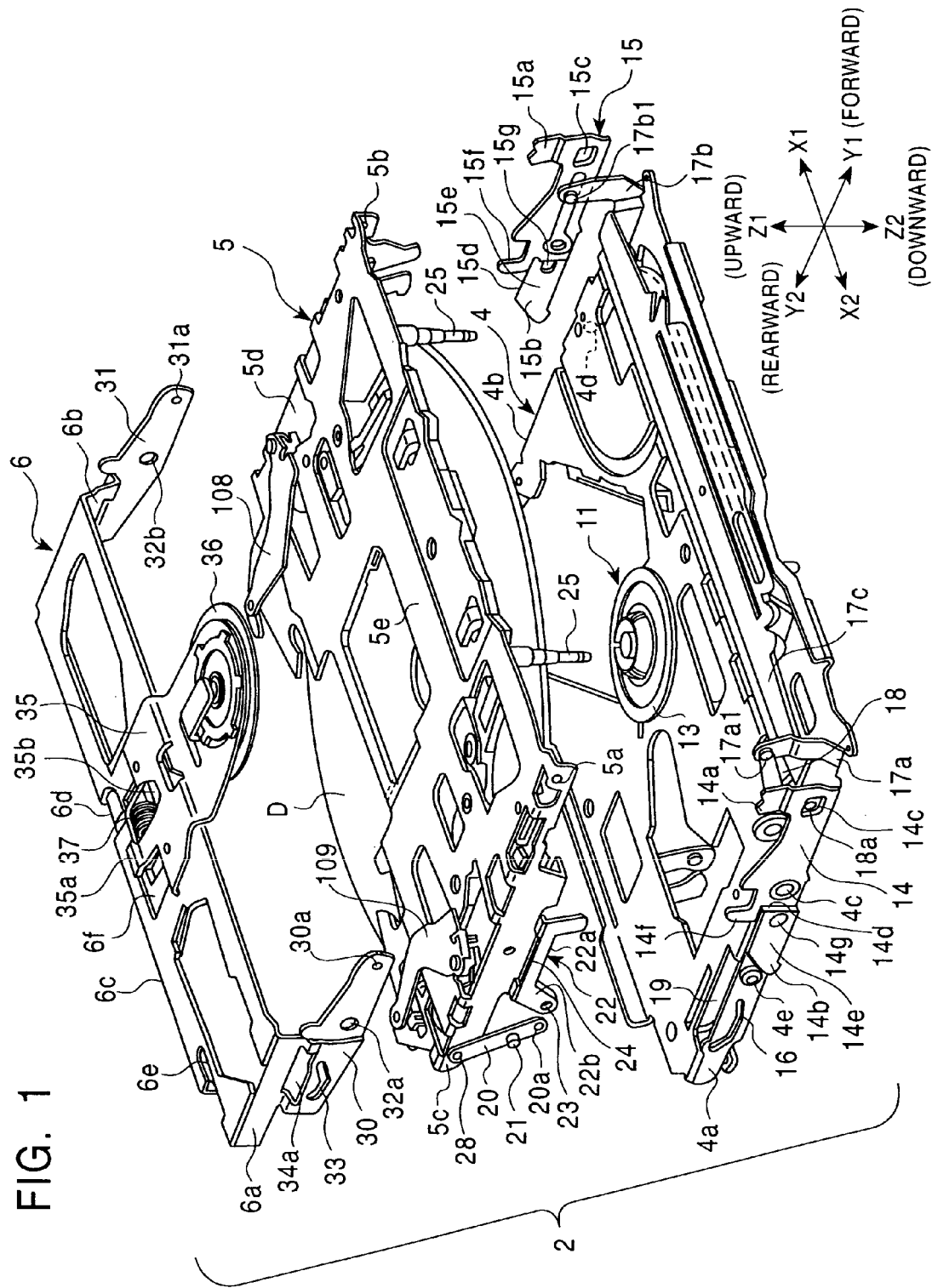
FIG. 1 is an exploded perspective view of a mechanism unit of a disk device according to the present invention.
Figure 2:
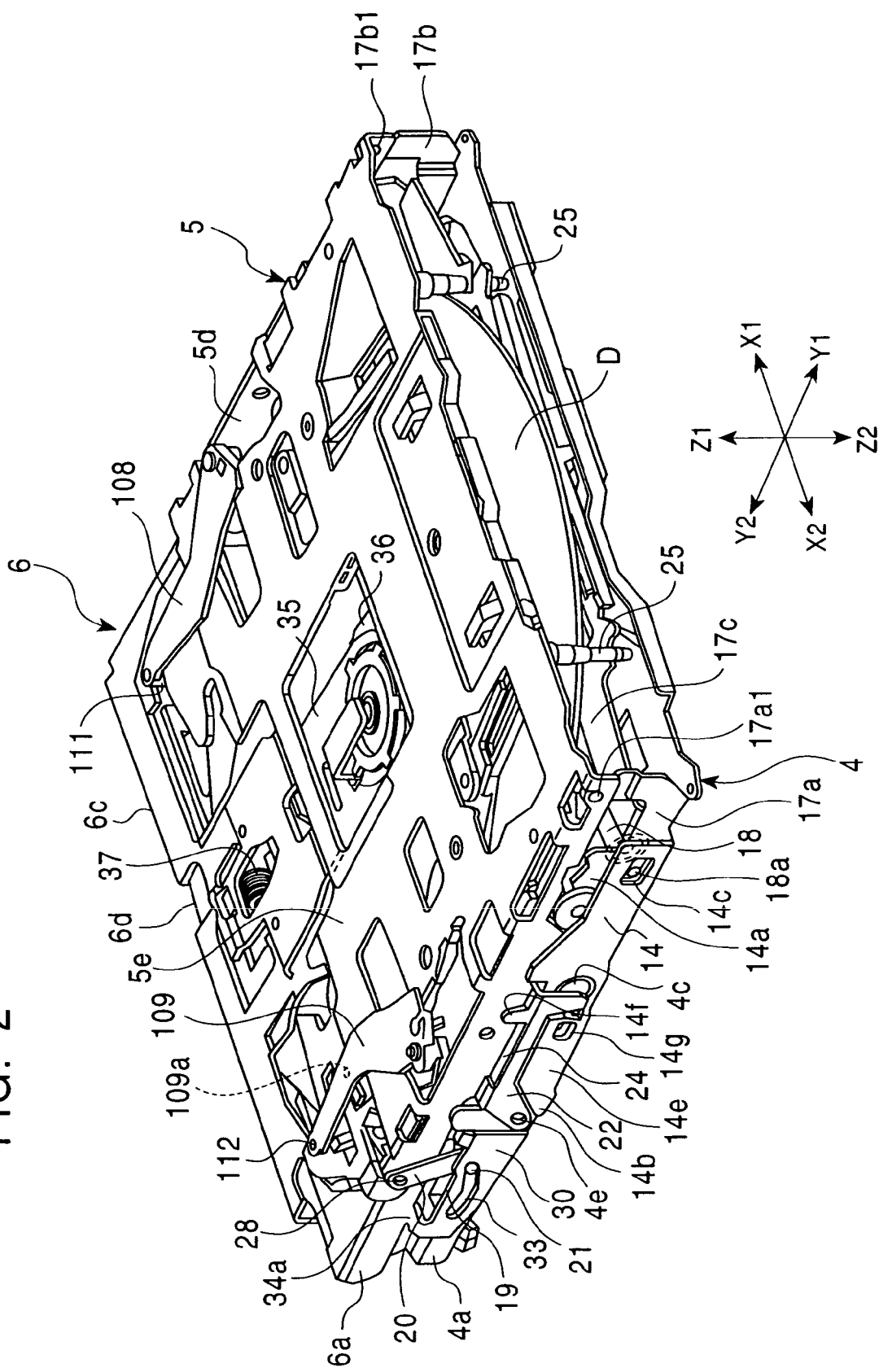
FIG. 2 is a perspective view showing the state of the mechanism unit after assembly.
Figure 3:
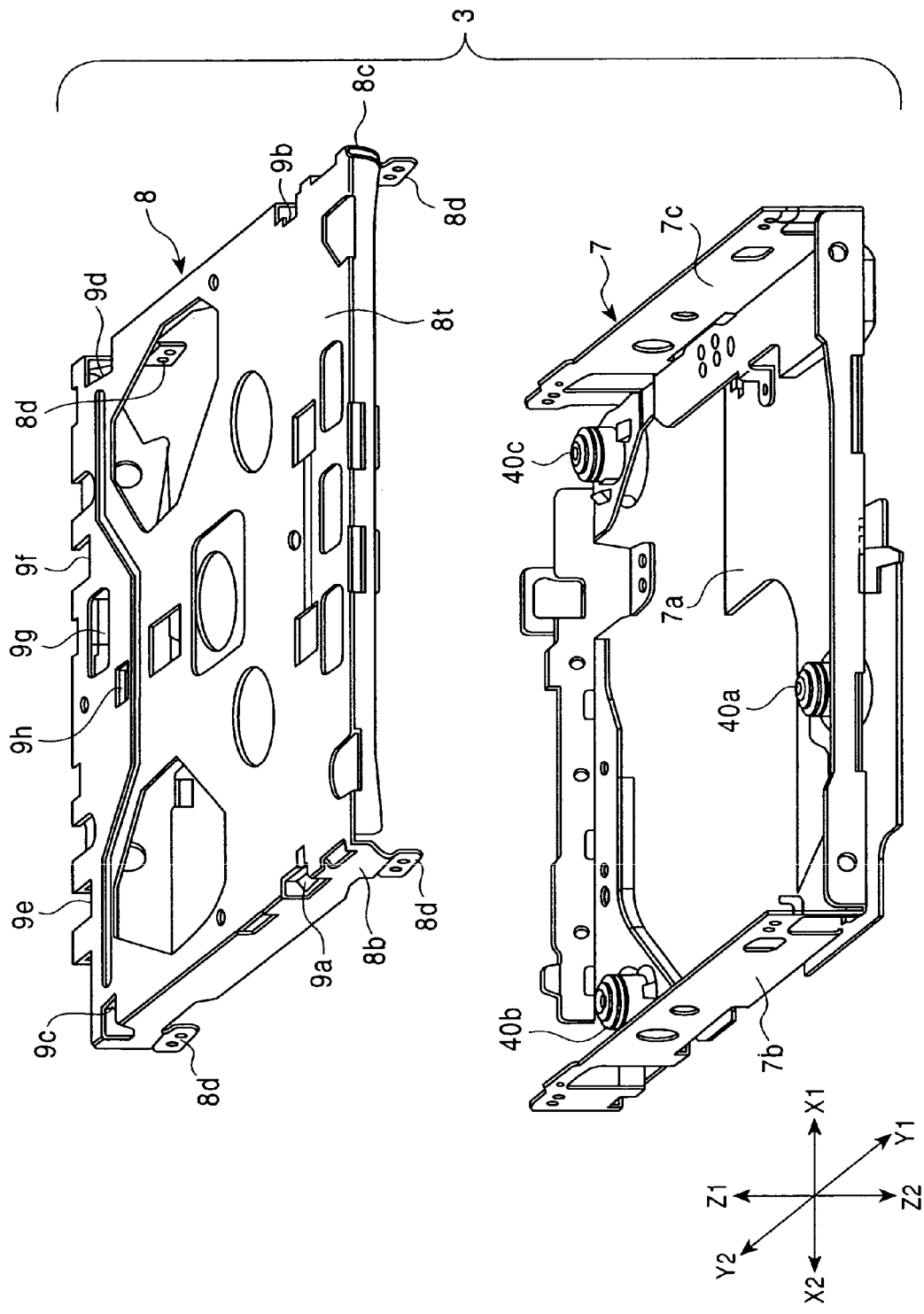
FIG. 3 is an exploded perspective view of an external chassis of the disk device according to the present invention.

As shown in FIGS. 1 and 3, the disk device 1 includes a mechanism unit 2 and an external chassis 3 into which the mechanism unit 2 is accommodated. As shown in FIGS. 1 and 2, the mechanism unit 2 is composed of a lower chassis 4, an upper chassis 5, and a clamp chassis 6. Also, as shown in FIG. 3, the external chassis 3 is composed of a lower base 7 and an upper base 8.

As shown in FIG. 1, the lower chassis 4 is provided with a rotational drive unit 11 disposed at the center. The rotational drive unit 11 includes a spindle motor 12 shown in FIGS. 11 and 13 and a turntable 13 attached to a rotational shaft of the rotational drive unit 11 used in placing a disk D.

On both sides of the lower chassis 4, side plates 4a and 4b are formed by bending, and the side plates 4a and 4b are provided with attitude set-up members 14 and 15 supported rotatably about shafts 4c and 4d, as fulcrums, parallel to the surface of the disk D loaded on the mechanism unit 2, respectively. The attitude set-up members 14 and 15 are arranged close to the front of the lower chassis 4 (Y1 direction) as plates disposed along the side plates 4a and 4b, respectively. The attitude set-up members 14 and 15 are provided with stepped parts 14d and 15d formed to the rear of the shafts 4c and 4d and fitting parts 14e and 15e formed like crank. The fitting parts 14e and 15e are separated from the front of the attitude set-up members 14 and 15 substantially by the thickness of the attitude set-up members 14 and 15, respectively.

At upper front ends of the attitude set-up members 14 and 15, abutment pieces 14a and 15a are fabricated, and at lower rear ends of the fitting parts 14e and 15e, abutment pieces 14b and 15b are integrally fabricated, respectively. Furthermore, at upper central ends, insertion projections 14f and 15f protrude upwardly. Moreover, adjacent to the front ends of the attitude set-up members 14 and 15, through-holes 14c and 15c are fabricated.

One side plate 4a of the lower chassis 4 is provided with a circular-arc elongated guide hole 16 located further rearward than the attitude set-up member 14. In an upper part of the elongated guide hole 16, a slender rectangular notch 19 is formed.

As shown in FIG. 1, adjacent to both front ends of the lower chassis 4, L-shaped rotary arms 17a and 17b are arranged. The rotary arms 17a and 17b are connected together with a plate 17c extending in the X direction. At front ends of the rotary arms 17a and 17b, axial projections 17a1 and 17b1 are fixed. The axial projections 17a1 and 17b1 are rotatably inserted into rotary holes 5a and 5b formed on front-end side faces of the upper chassis 5, respectively. The axial projection 17a1 protrudes outward (X2 direction) and is inserted into the rotary hole 5a from the inside while the axial projection 17b1 protrudes inward (X2 direction) and is inserted into the rotary hole 5b from the outside.

At a position adjacent to the rear ends of the rotary arms 17a and 17b in the Y2 direction, a roller 18 is arranged. The roller 18, made of a material with a high coefficient of friction such as rubber, is a long circular cylinder extending in the axial direction (X direction) with a diameter small in the intermediate portion and gradually increasing toward both ends. A roller shaft 18a is inserted into the roller 18, and both ends of the roller shaft 18a are rotatably supported by the rotary arms 17a and 17b, respectively. Both ends of the roller shaft 18a protrude outside and are inserted into the through-holes 14c and 15c formed in the attitude set-up members 14 and 15 so as not to exit therefrom and to be directly connected to the attitude set-up members 14 and 15, respectively.

The rotary arms 17a and 17b, the plate 17c, the roller 18, and the roller shaft 18a constitute a conveying mechanism for conveying the disk D inside and outside the disk device 1.

In the upper chassis S, side plates 5c and 5d are formed by bending, and one side plate 5c is provided with a connection member 20. The connection member 20, made of a slender plate material, is rotatably supported by the side plate 5c at a rear anchor by a shaft 28. Also, the connection member 20 is provided with a shaft hole 20a formed at the end extremity. Between the shaft hole 20a and the shaft 28, which is a rotational fulcrum, a guide projection 21 is fixed protruding outward.

On the side plate 5c of the upper chassis 5, a fitting piece 22 is integrally fabricated. The fitting piece 22 is formed at the lower edge of the side plate 5c and has a trapezoid-form notch 22a. The shape of the notch 22a agrees with the shape of the fitting part 14e of the attitude set-up member 14. A connection hole 23 is formed on a leg portion 22b at the rear of the fitting piece 22. At the boundary between the side plate 5c and the fitting piece 22, an insertion hole 24 is formed so as to extend in the Y direction, and into this insertion hole 24, the insertion projection 14f formed in the attitude set-up member 14 can be inserted.

On the other side plate 5d of the upper chassis 5, another fitting piece 22 having the insertion hole 24 is fabricated in the same way, so that the insertion projection 15f formed in the attitude set-up member 15 can be inserted into the insertion hole 24.

Beneath the upper chassis 5, detection pins 25 and 25 and positioning pins 111 and 112, which are shown in FIG. 2 and will be described later, are movably arranged forward and rearward, respectively. By means of the forward detection pins 25 and 25, the insertion and discharge operations of the disk D are detected while by means of the rearward positioning pins 111 and 112, the disk D can be positioned on the turntable 13 of the rotational drive unit 11. During the rotation of the disk D, all of the detection pins 25 and 25 and the positioning pins 111 and 112 are controlled so as not to contact the external peripheral edge of the disk D, thus protecting the recording and reproducing operations of the disk D from being hindered.

On both sides of the clamp chassis 6, side plates 6a and 6b are formed by bending, and the side plates 6a and 6b are provided with arms 30 and 31, which are integrally formed at the lower ends and partly protrude forward. The arms 30 and 31 are provided with support holes 32a and 32b, respectively, formed at the center in the Y direction. In one arm 30, a circular arc guide hole 33 is formed at the rear. In a connection portion between one side plate 6a and the arm 30, an insertion hole 34a extending in the Y direction is formed. Furthermore, at the tips of the arms 30 and 31, connection holes 30a and 31a are formed.

On the upper surface of the clamp chassis 6, a clamp arm 35 having a damper 36 at the center of the end extremity in the X direction is supported. The clamp arm 35 is supported to the clamp chassis 6 rotatably about a rotational fulcrum part 35b in the up and down directions. The rotational fulcrum part 35b is provided with an elastic member 37 made of a torsion coil spring, so that a tip of the clamp arm 35 further than the rotational fulcrum part 35b in the Y1 direction is urged downwardly by the elastic member 37.

At the end extremity of the clamp chassis 6 in the Y1 direction, the damper 36 is rotatably supported. At the rear end opposite to a supporting part of the damper 36 with the rotational fulcrum part 35b therebetween, an upward-elevated abutment part 35a is arranged. The clamp chassis 6, the clamp arm 35, the damper 36, and the elastic member 37 constitute the clamping mechanism.

When the disk D is transferred toward the mechanism unit 2 in the Y2 direction, the damper 36 is raised upward so as to separate from the turntable 13. If the disk D is positioned by the positioning pins 111 and 112 located in the rear after being transferred into the mechanism unit 2, the clamp arm 35 is rotated downward so that the damper 36 clamps the disk D to the turntable 13 by means of the urging force of the elastic member 37.

As shown in FIG. 2, the clamp chassis 6 is inserted and assembled into the upper chassis 5 from the rear. At this time, the front of the clamp arm 35 is inserted into a position lower than a top plate 5e of the upper chassis 5; the connection member 20 is inserted into the insertion hole 34a from above; and the guide projection 21 is slidably inserted into the guide hole 33. At this time, a protruding portion at the front of the arm 30 is inserted inside the fitting piece 22 of the upper chassis 5 and further inserted into a gap between the side plate 4a of the lower chassis 4 and the attitude set-up member 14. Then, the connection holes 30a and 31a formed at tips of the arms 30 and 31 are directly connected to connection holes 14g and 15g formed at positions further than the shafts 4c and 4d in the Y2 direction in the attitude set-up members 14 and 15 with a connection pin 110 shown in FIG. 9, respectively. Thereby, both the attitude set-up members 14 and 15 are connected together via the clamp chassis 6, so that the attitude set-up members 14 and 15 operate in synchronism with each other.

Figure 9:
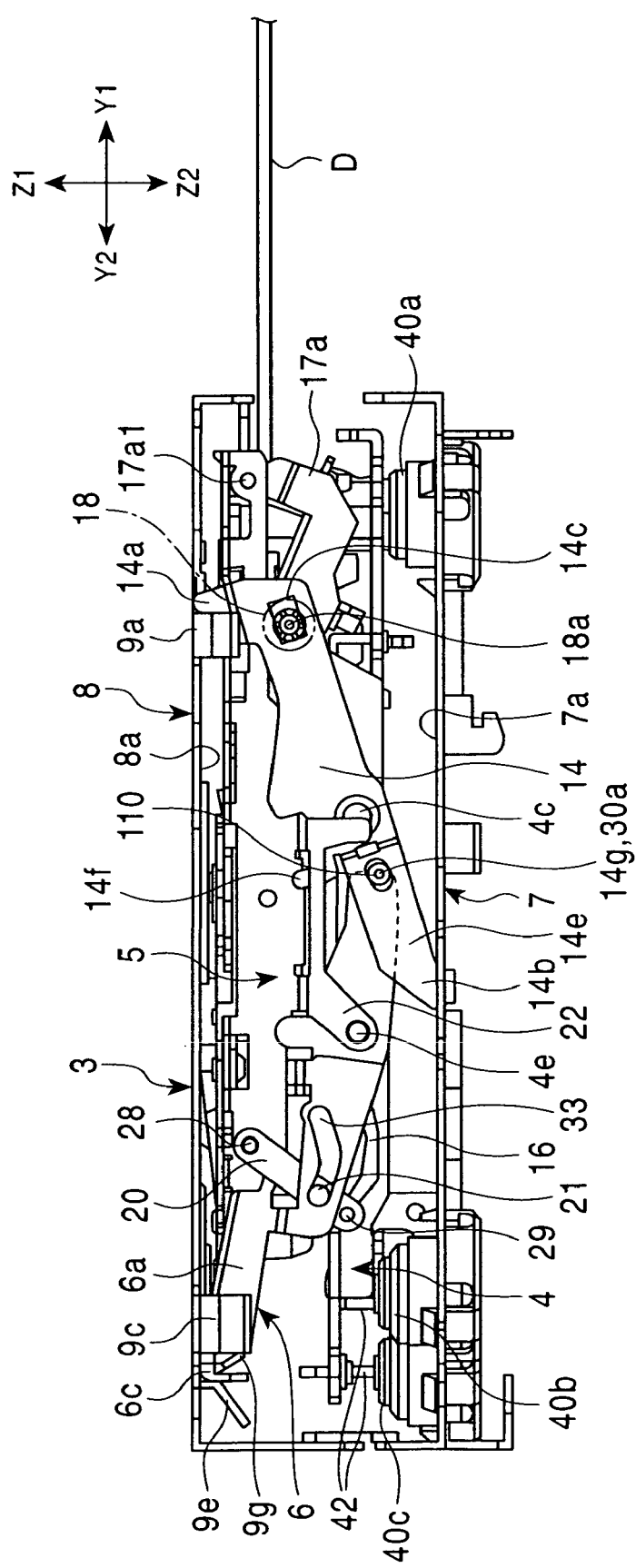
FIG. 9 is a side view of the disk device in a disk conveying state.

In order to connect the upper chassis 5 to the lower chassis 4, as shown in FIG. 9, the connection member 20 is inserted into the notch 19, so that the shaft hole 20a of the connection member 20 and the elongated guide hole 16 formed in the upper chassis 5 are connected together with a shaft part 29. The fitting parts 14e and 15e of the attitude set-up members 14 and 15 are placed in the notch 22a fabricated in the fitting piece 22 of the upper chassis 5, and the insertion projection 14f is inserted into the insertion hole 24. Furthermore, a projection 4e formed on the side plate 4a of the lower chassis 4 is inserted into the connection hole 23 of the upper chassis 5 and the support hole 32a of the arm 30 in the clamp chassis 6.

Thereby, the lower chassis 4 and the upper chassis 5 are fixed together substantially in parallel to each other with a gap maintained therebetween, and the clamp chassis 6 is supported rotatably about the projection 4e as a fulcrum. Also, the clamp chassis 6 and the attitude set-up members 14 and 15 are connected together so as to rotate in a direction opposite to each other.

In the side face in the X1 direction of the disk device 1, the lower chassis 4, the upper chassis 5, and the clamp chassis 6 are connected together in the same way except in the vicinity of the connection member 20.

Figure 4:
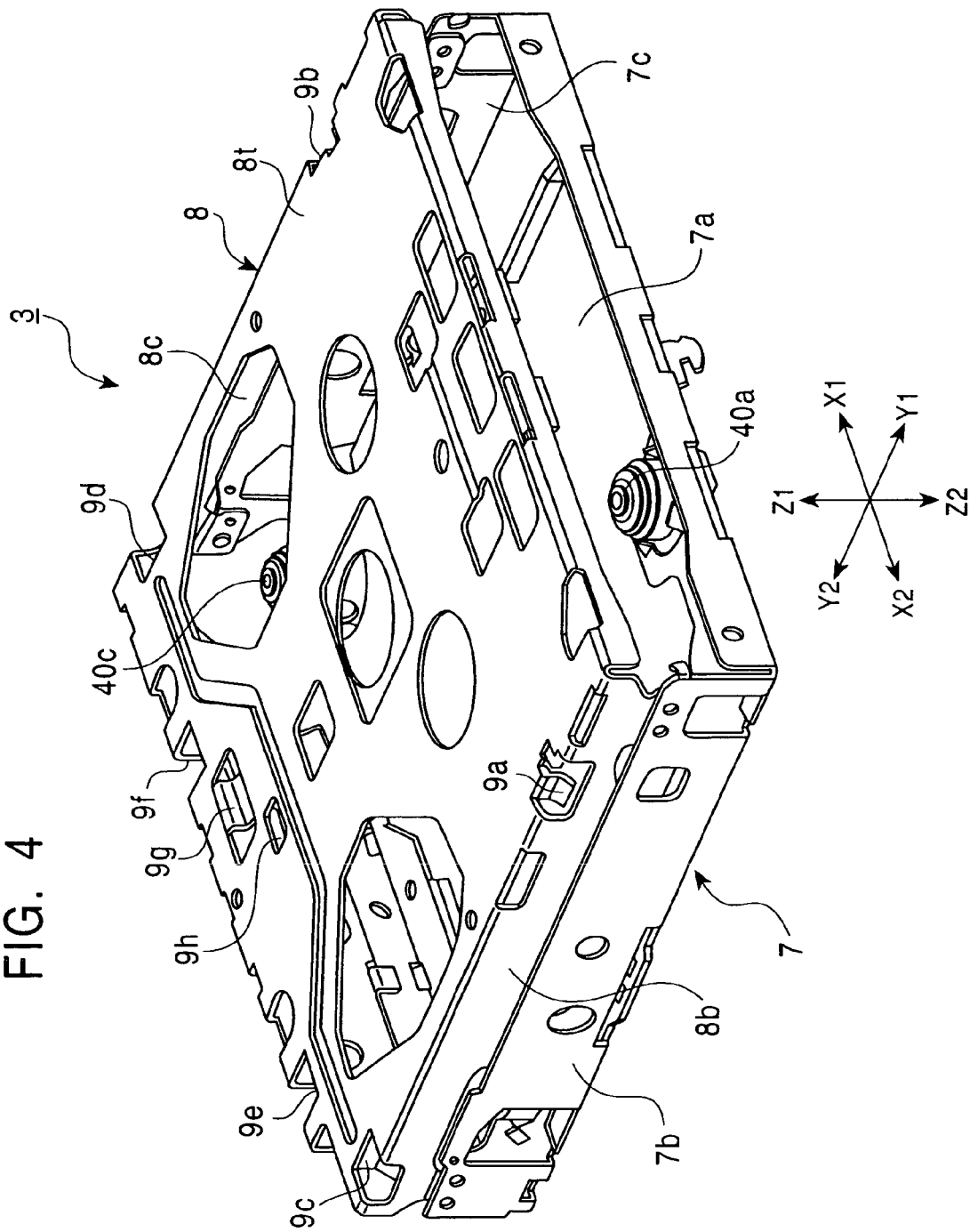
FIG. 4 is a perspective view showing the state of the external chassis after assembly.
Figure 8:
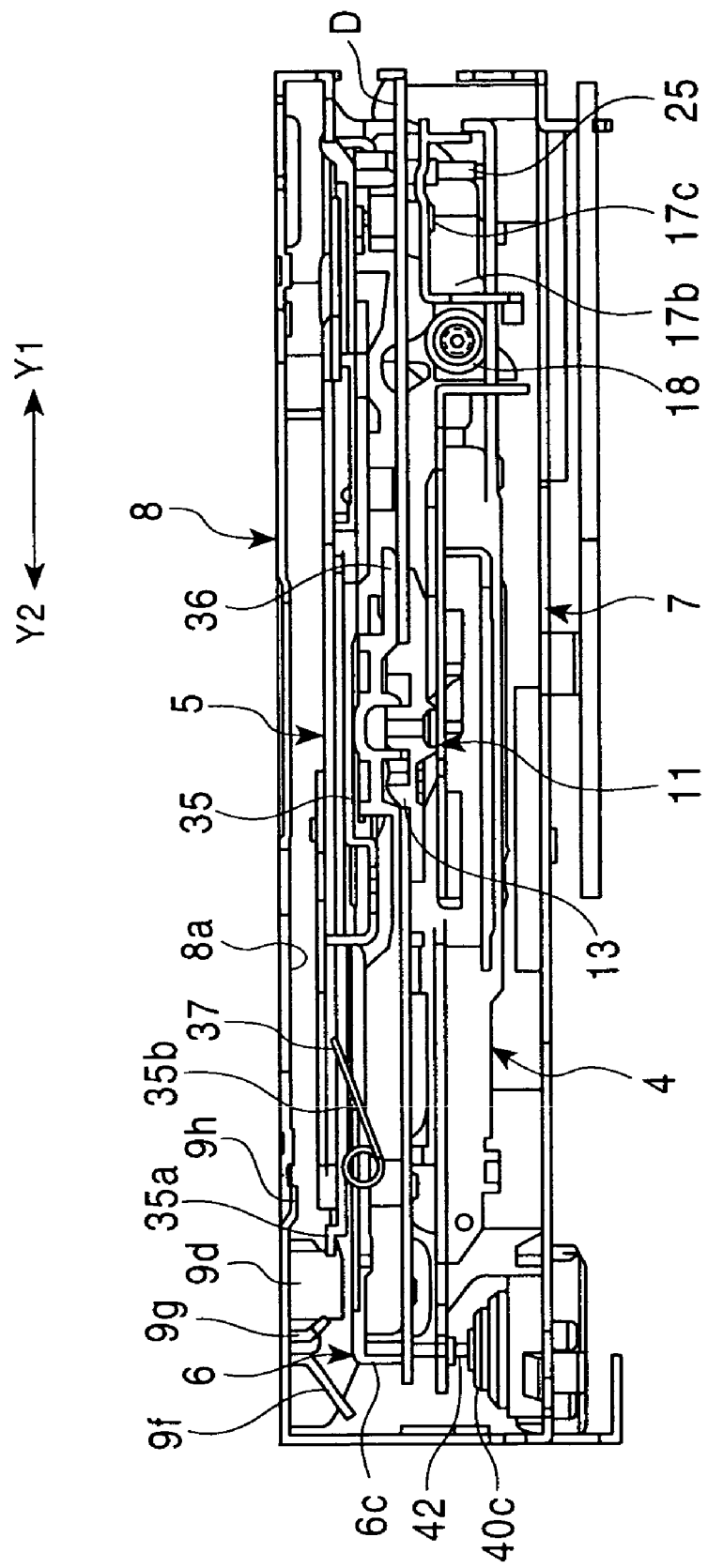
FIG. 8 is a sectional view at the line VIII—VIII of FIG. 5 showing the disk driving state of the disk device.
Figure 10:
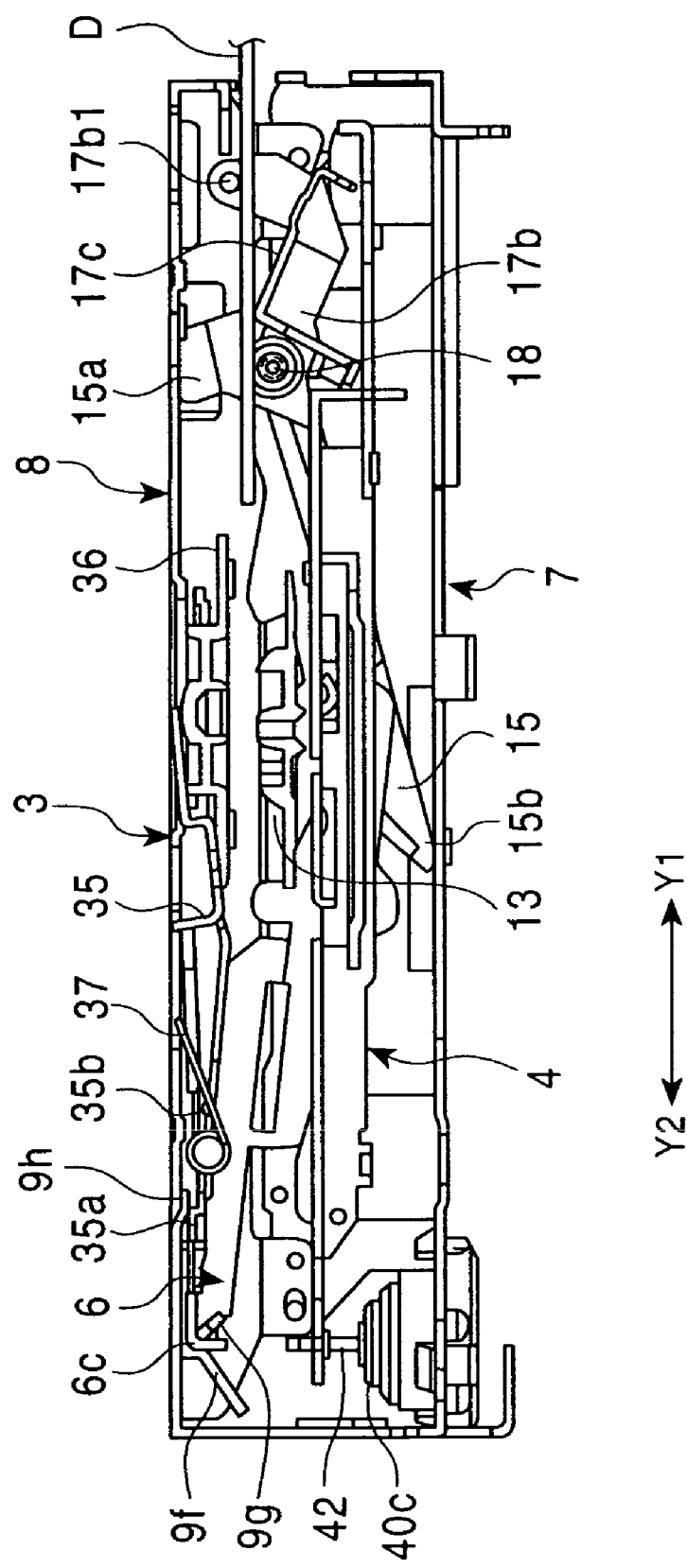
FIG. 10 is a sectional view at the line VIII—VIII of FIG. 5 showing the disk conveying state of the disk device.

As shown in FIGS. 3 and 4, on both sides of a bottom plate 7a of the lower base 7, side plates 7b and 7c are formed by vertical bending. On the top surface of the bottom plate 7a, elastic support members 40a, 40b, and 40c, such as an oil damper, an air damper, or a coil spring, are attached at three positions that are substantially along the center in the Y1 direction and on both sides of the X direction in the Y2 direction. As shown in FIGS. 8, 9, and 10, three support pins 42 extending downward are fixed to the lower chassis 4, and the support pins 42 are supported by the elastic support members 40a, 40b, and 40c, respectively. Therefore, the entire mechanism unit 2 is elastically supported on the lower base 7. Owing to this elastic support, if the disk device 1 is to be vehicle-mounted, vibrations of a vehicle body are not directly transmitted to the mechanism unit 2.

On both sides of the upper base 8, side plates 8b and 8c are formed by vertical bending, and the side plates 8b and 8c are provided with fixing pieces 8d fabricated at each corner in the Y1 and Y2 directions, respectively. The fixing pieces 8d are fixed to the side plates 7b and 7c of the lower base 7 with screws.

Figure 5:
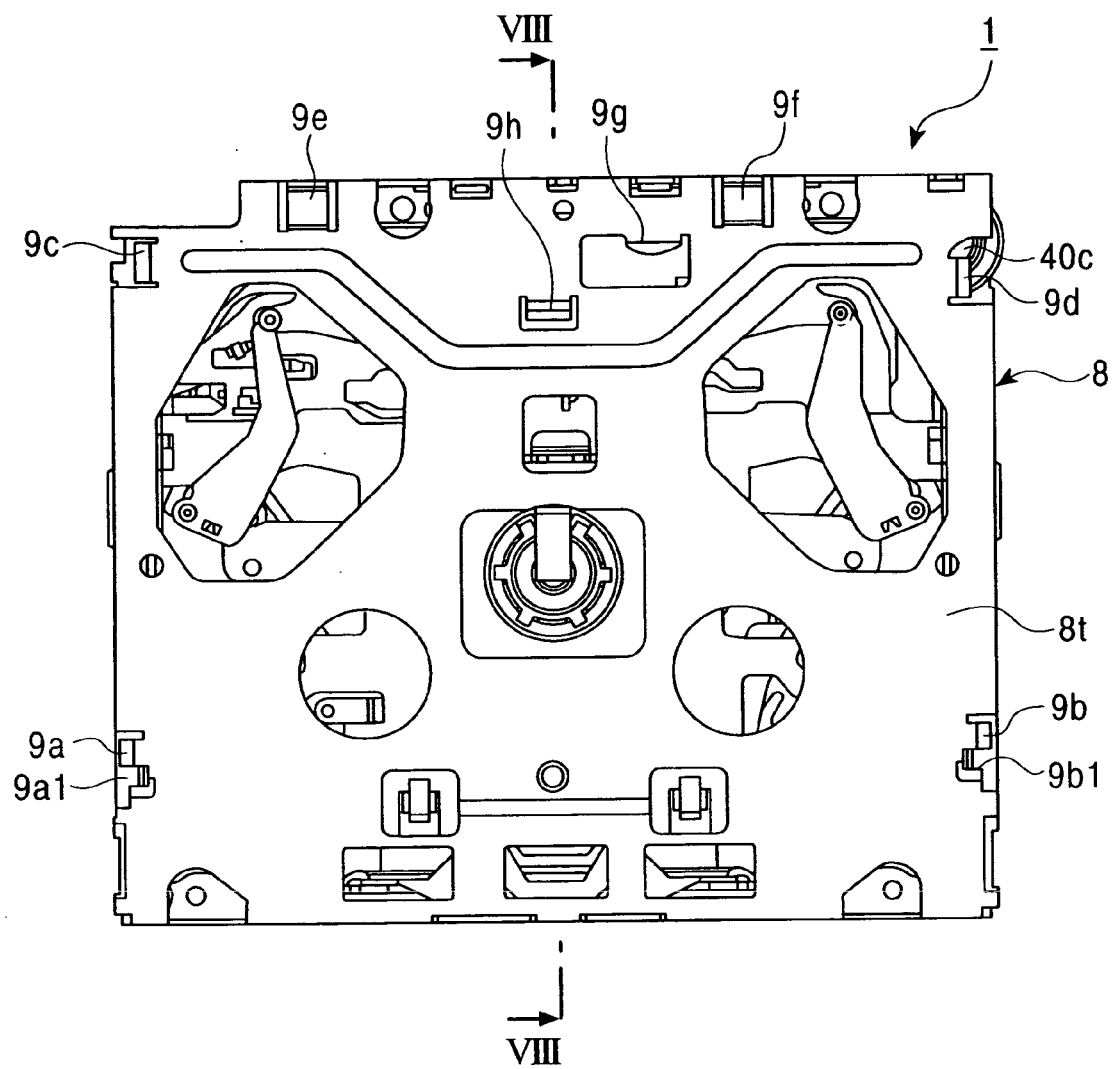
FIG. 5 is a plan view showing the state of the mechanism unit and the external chassis after assembly.
Figure 5:
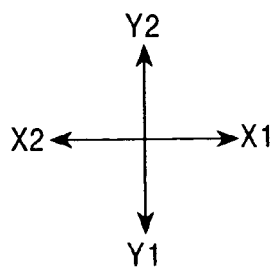

On the upper base 8, a plurality of support pieces 9a, 9b, 9c, 9d, 9e, 9f, and 9g are fabricated. The support pieces 9a to 9d are perpendicularly bent inside in the Z2 direction so that the tips thereof are slightly bent obliquely outside (in the X1 and X2 directions). The support pieces 9e and 9f are perpendicularly bent inside in the Z2 direction so that the tips thereof are slightly bent obliquely inside (in the Y1 direction). Furthermore, as shown in FIGS. 5, 8, and 10, at substantially the center of the upper base 8 in the Y2 direction, a fixing piece (fixing part) 9h is fabricated by stepwise bending in the Z2 direction.

Inside the external chassis 3 structured in such a manner, the mechanism unit 2 is provided and supported by the elastic support members 40a, 40b, and 40c.

Figure 11:
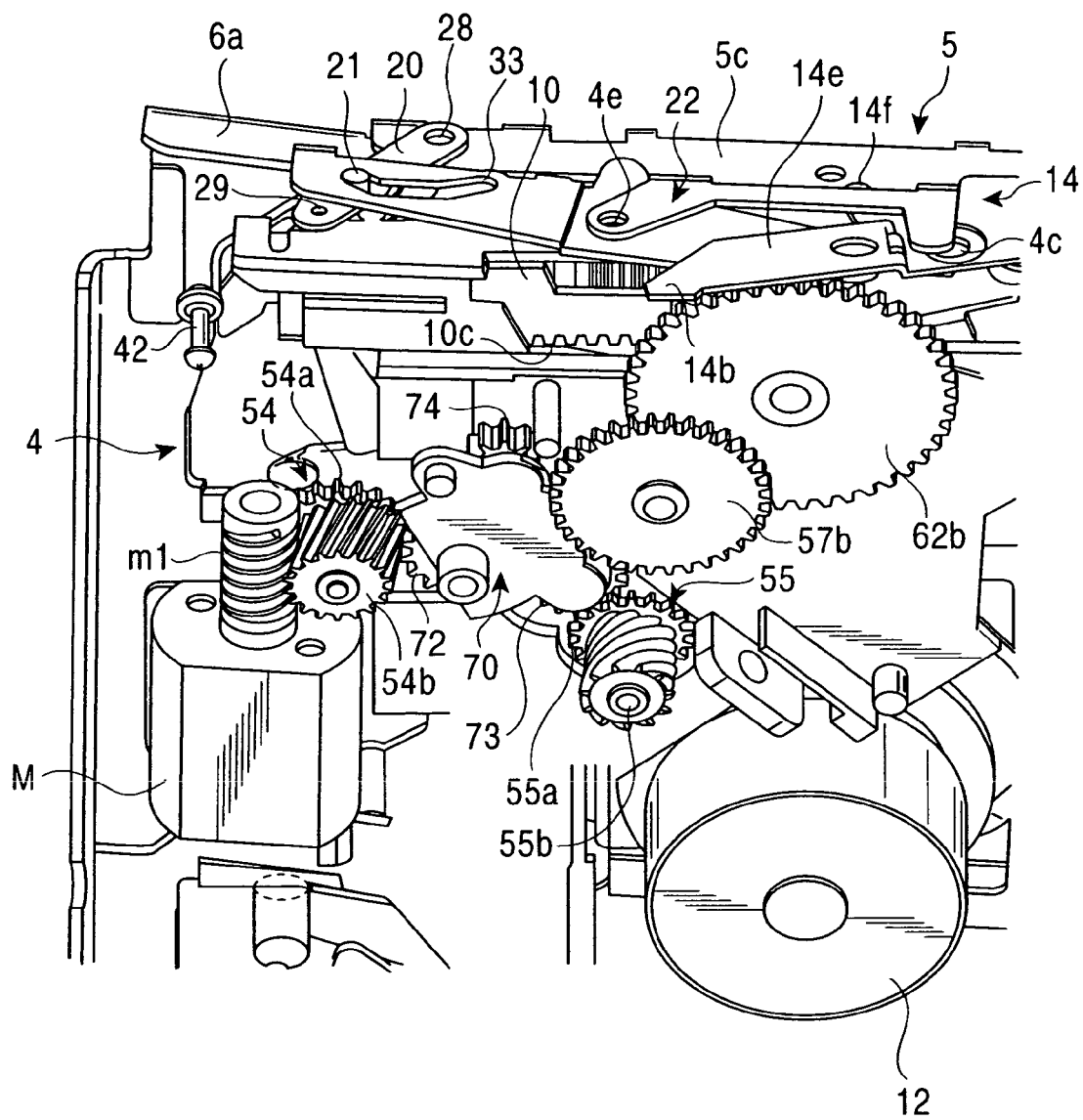
FIG. 11 is a perspective view of the disk device viewed from the rear side of FIG. 2 showing a locked state of the mechanism unit.
Figure 12:
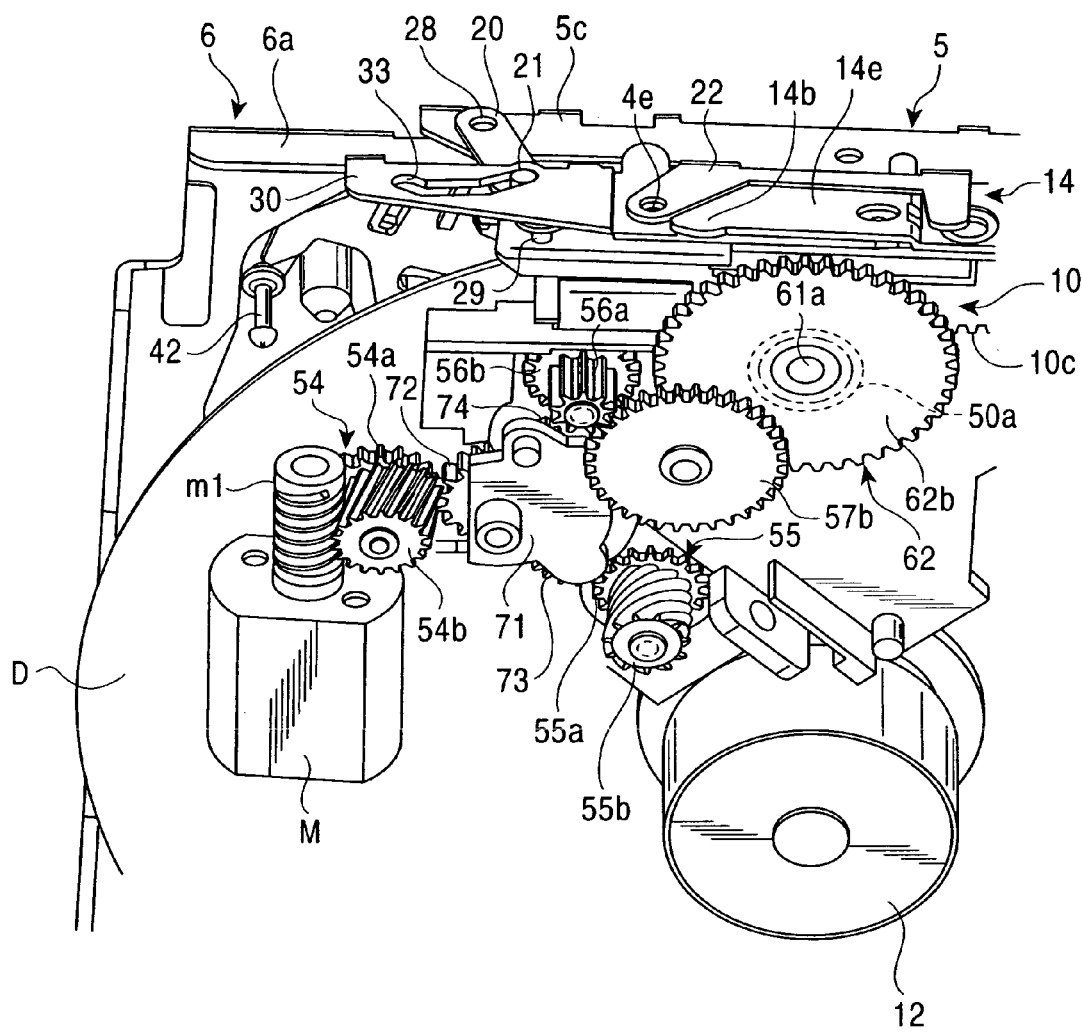
FIG. 12 is a perspective view of the disk device viewed from the rear side of FIG. 2 showing a disk conveying state of the mechanism unit.
Figure 13:
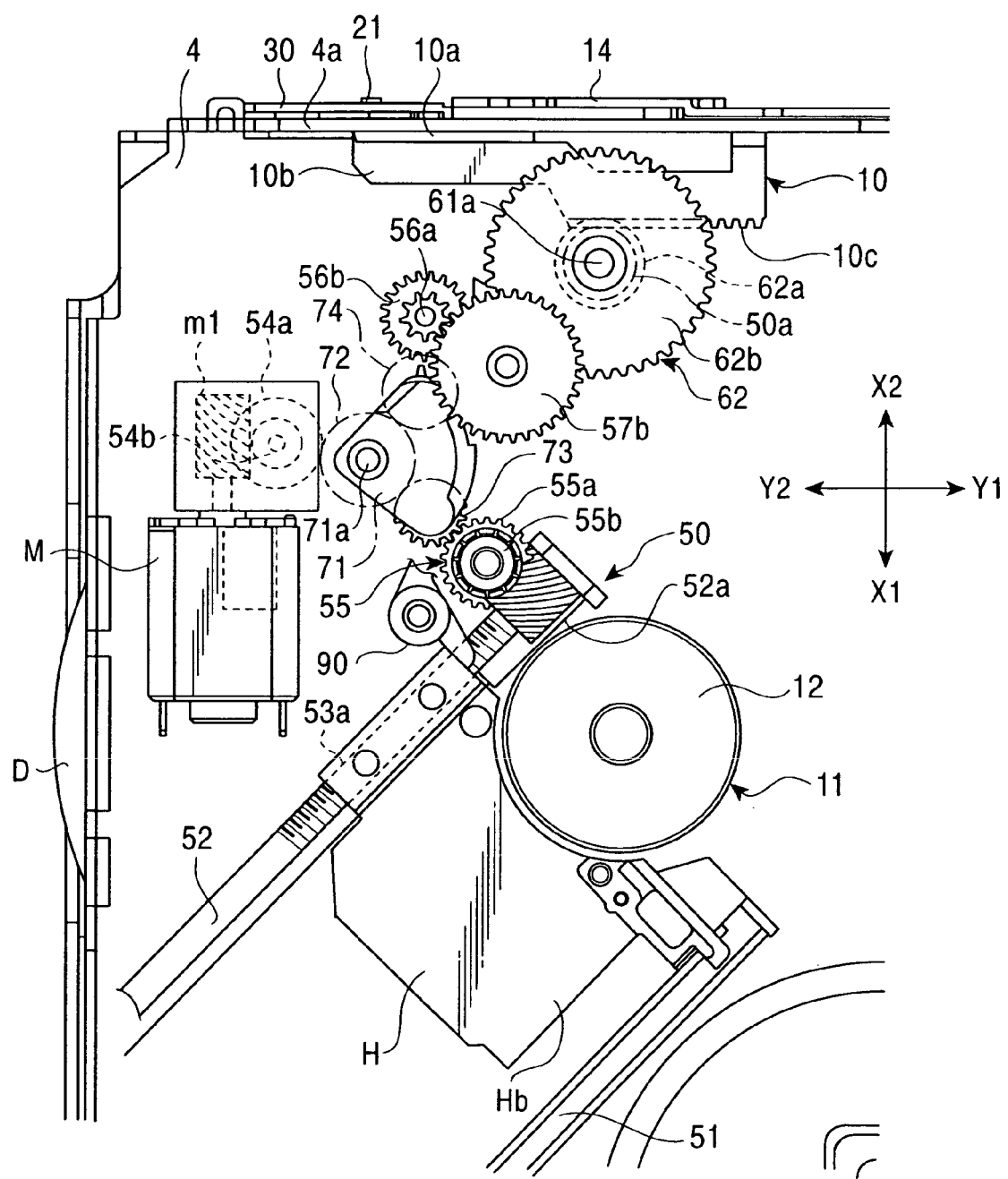
FIG. 13 is a bottom plan view of the disk device showing the disk conveying state of the mechanism unit.
Figure 14:
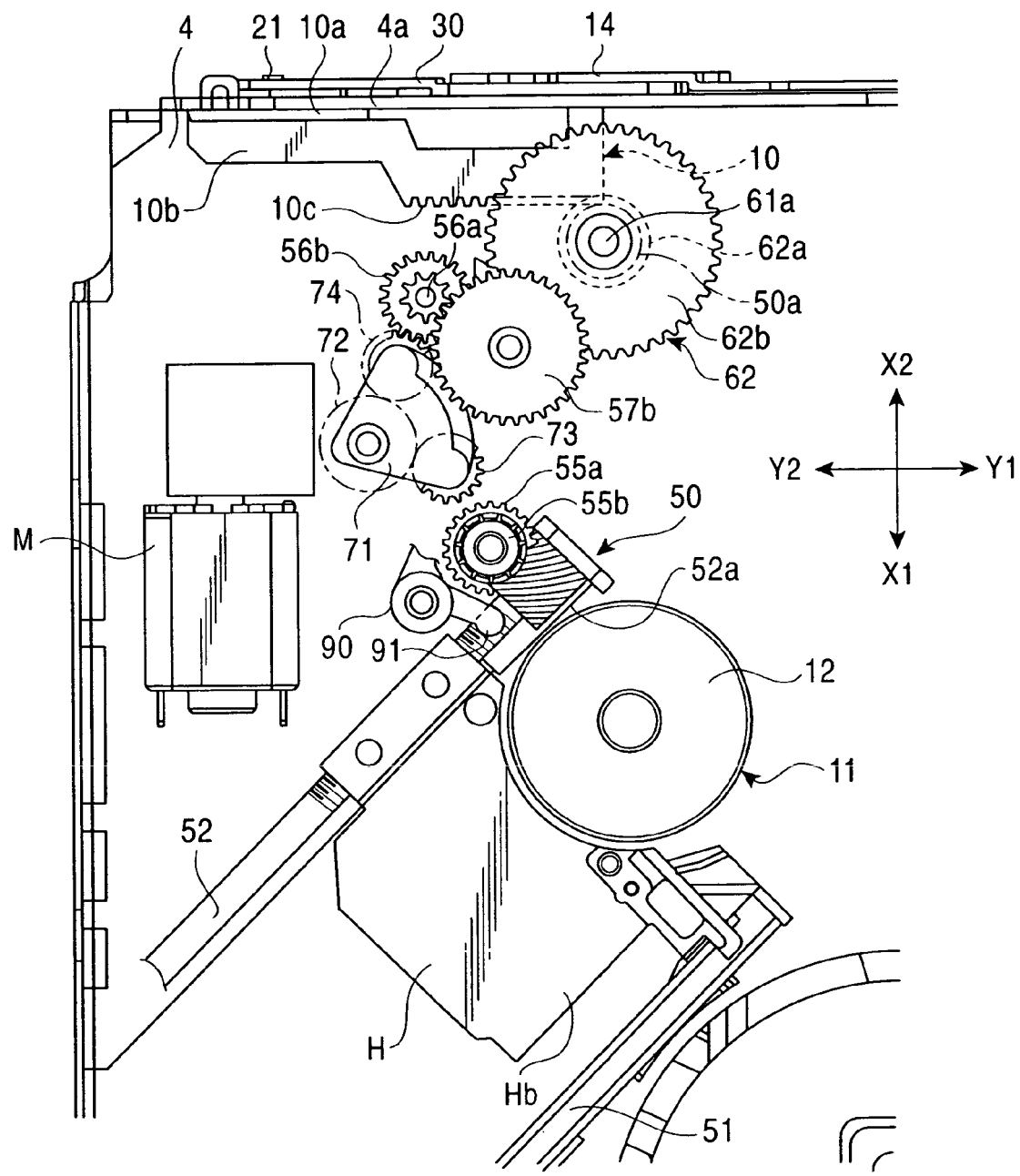
FIG. 14 is a bottom plan view of the disk device showing the locked state of the mechanism unit.

FIGS. 11 and 12 are perspective views of the mechanism unit 2 including the lower chassis 4, the upper chassis 5, and the clamp chassis 6 assembled therein, viewed obliquely from below; and FIGS. 13 and 14 are bottom views thereof. As shown in FIG. 11, in the disk device 1 according to the embodiment, there is provided a switching mechanism having a motor M on the bottom side of the lower chassis 4. By means of the switching mechanism, the power of the motor M is transmitted selectively so as to choose between a driving force for moving an optical head along the radial direction of the disk D and a driving force for rotating the roller 18 for conveying the disk D.

As shown in FIG. 13, on the backside of the lower chassis 4, there is provided a power transmission member 10 supported movably in the Y direction. The power transmission member 10 includes a plate portion 10a parallel to the side plate 4a and a plate portion 10b disposed perpendicularly to the plate portion 10a, and is structured like a T-shape. A rack 10c is formed in the plate portion 10b in the Y1 direction. The rack 10c is meshed with a drive gear 50a, which rotates about a central axis 61a of a control member 61 shown in FIGS. 17 to 19, and rotates together with the control member 61.

Figure 15:
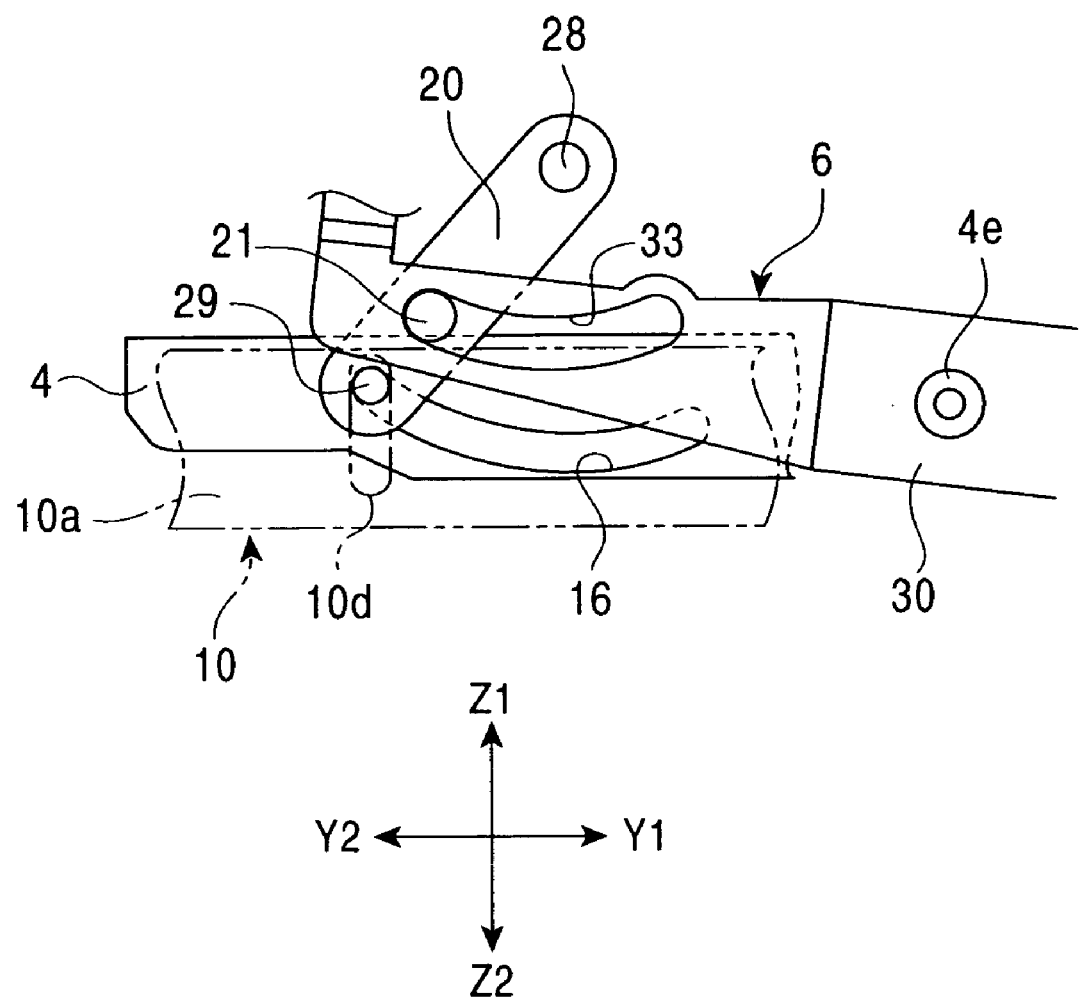
FIG. 15 is a partly enlarged side view of FIG. 9.

As shown in FIG. 15, the plate portion 10a of the power transmission member 10 is provided with an elongated hole 10d formed therein, into which the shaft part 29 connecting the shaft hole 20a of the connection member 20 to the elongated guide hole 16 fabricated in the lower chassis 4 is slidably inserted. If the power transmission member 10 is moved in the Y direction, a moving force in the Y direction is applied to the shaft part 29, so that the connection member 20 rotates while being guided by the elongated guide hole 16 fabricated in the lower chassis 4.

Figure 7:
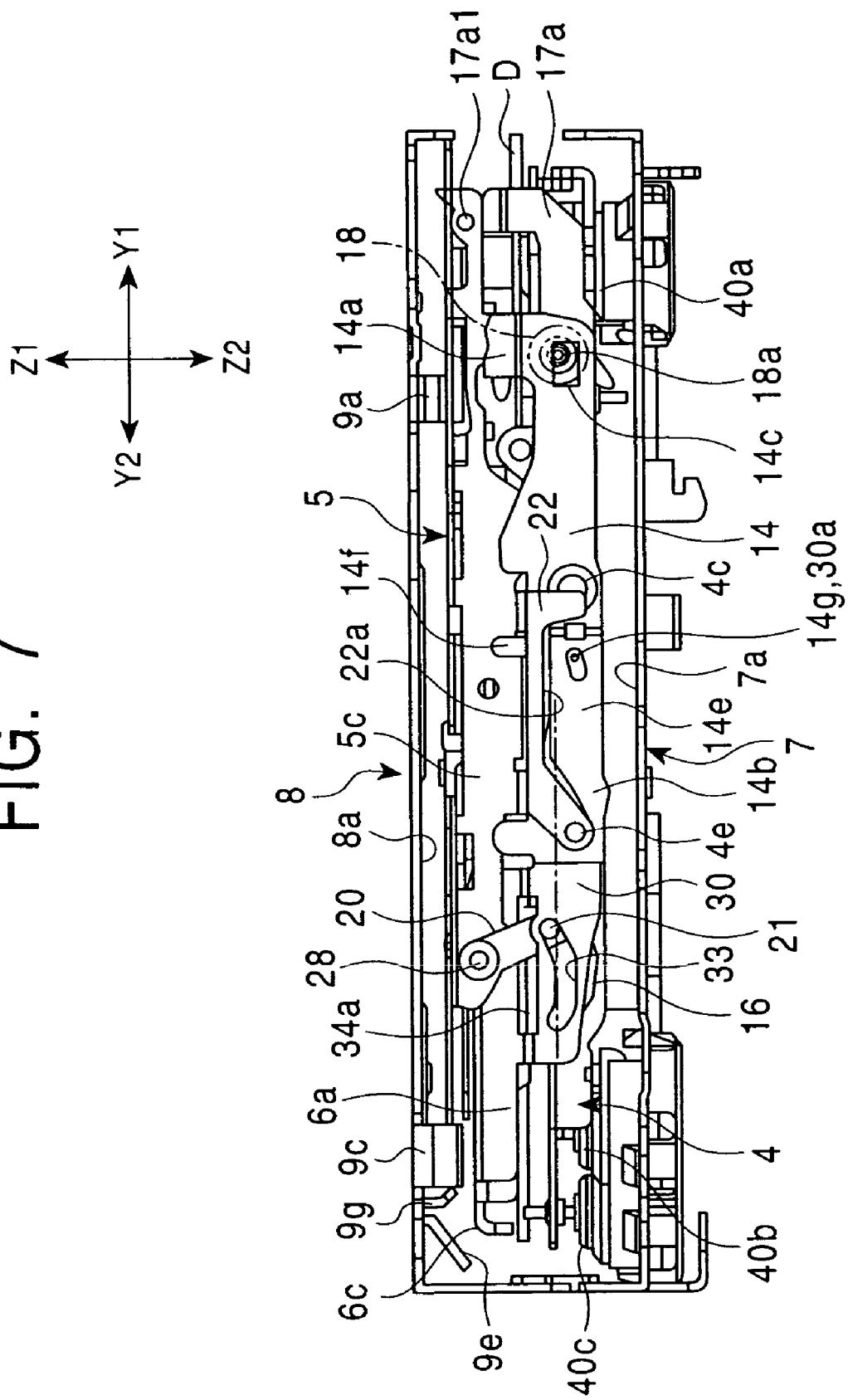
FIG. 7 is a side view of the disk device in a driving state.

The elongated guide hole 16 fabricated in the side plate 4a of the lower chassis 4 extends along a predetermined radial locus about the shaft 28, which is a rotational fulcrum of the connection member 20. On the other hand, the end in the Y2 direction of the guide hole 33 formed in the arm 30 of the clamp chassis 6 is located at a position farther from the shaft 28, and the end in the Y1 direction is located at a position closer to the shaft 28. Therefore, as shown in FIG. 7, if the connection member 20 rotates counterclockwise, the clamp chassis 6 is counterclockwise rotated about the projection 4e as a fulcrum while as shown in FIG. 9, if the connection member 20 rotates clockwise, the clamp chassis 6 rotates clockwise.

According to the embodiment, the drive gear 50a, the power transmission member 10, and the connection member 20 constitute a drive mechanism for applying rotational forces to the attitude set-up members 14 and 15.

Next, the switching mechanism will be described.

As shown in FIG. 13, on the lower chassis 4 of the mechanism unit 2, there are provided an optical head H having an object lens and a head transferring mechanism 50 for translating the optical head H along the recording surface of the disk D in the radial direction of the disk D.

The head transferring mechanism 50 principally includes a guide shaft 51 for movably supporting the optical head H and a screw shaft 52 for applying a moving force to the optical head H. The optical head H includes a head base Hb, in which a drive hole 53a is formed, and the drive hole 53a surrounds the screw shaft 52 so that a retainer such as a female screw fabricated in the drive hole 53a is brought into engagement with a thread groove of the screw shaft 52. Accordingly, rotating the screw shaft 52 moves the optical head H in the radial direction of the disk D.

Figure 16:
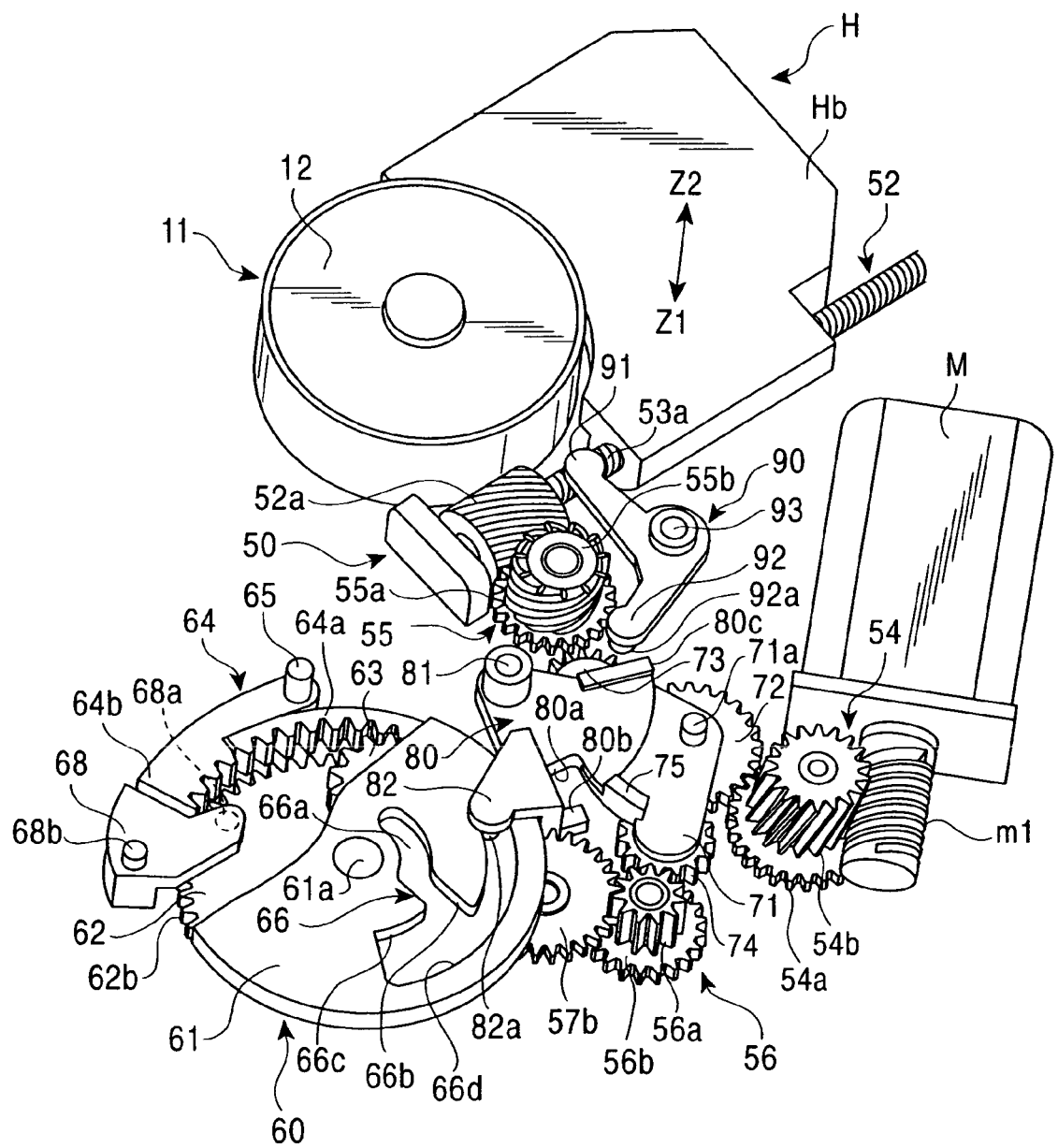
FIG. 16 is a perspective view of a switching mechanism of the disk device shown from the rear side.

As shown in FIG. 11, the motor M is fixed to the lower chassis 4, and a worm gear m1 is fixed to an output shaft of the motor M. On the bottom surface of the lower chassis 4, there is provided a two-stage gear 54 including a large spur gear 54a and a small worm wheel 54b which are integrally constructed, so that the small worm wheel 54b is meshed with the worm gear m1. As shown in FIGS. 13 and 16, at one end of the screw shaft 52 constituting the head transferring mechanism 50, a worm wheel 52a is fixed. At the lateral position of the worm wheel 52a, there are provided a worm gear 55b meshing with the worm wheel 52a and a large spur gear 55a, which are integrally constructed so as to constitute a two-stage gear 55.

Between the two-stage gears 54 and 55, a swing arm 71 constituting part of a switching mechanism 70 is provided.

As shown in FIG. 13, the swing arm 71 is substantially formed like a sector shape and is rotatably supported by the lower chassis 4 about a shaft 71a as a fulcrum. Between the swing arm 71 and the lower chassis 4, there is provided a driving spur gear 72 rotatably supported about the shaft 71a. The driving spur gear 72 is constantly meshed with the large spur gear 54a of the two-stage gear 54 so that the power of the motor M is transmitted to the driving spur gear 72 via the two-stage gear 54.

On the swing arm 71, a switching spur gear 73 facing the two-stage gear 55 is rotatably supported and is constantly meshed with the driving spur gear 72. The swing arm 71 is also provided with a switching spur gear 74 rotatably supported thereto so as to constantly mesh with the driving spur gear 72 at a different position. The driving of the driving spur gear 72 simultaneously rotates both the switching spur gear 73 and the switching spur gear 74, which are meshed with the driving spur gear 72. By the swinging operation of the swing arm 71, the rotational power of the driving spur gear 72 is selectively transmitted to the two-stage gear 55 or a two-stage gear 56, which will be described later.

As shown in FIG. 16, the swing arm 71 is provided with an integrally formed lock projection 75 protruding in a direction (Z2 direction) opposite to the position where the gears 72, 73, and 74 are arranged. In the lower chassis 4, there is provided a lock control plate 80, which is substantially sector-shaped and arranged at a position partly overlapping the swing arm 71. The lock control plate 80 is supported rotatably about a shaft 81 fixed to the lower chassis 4, and is also urged counterclockwise by a spring (not shown). A rectangular lock recess 80a is fabricated like a notch at the periphery of the lock control plate 80. The lock control plate 80 is also provided with a restriction piece 80b occupying part of the lock recess 80a.

In a clearance between the lock control plate 80 and a movement range of the optical head H, a switching arm 90 constituting part of the switching mechanism 70 is arranged. The switching arm 90 is supported rotatably about a shaft 93 fixed on the bottom plate of the lower chassis 4. The switching arm 90 is shaped like a boomerang and includes an input arm 91 extending toward the optical head H and an output arm 92 extending toward the lock control plate 80. At the tip of the output arm 92, a pressure projection 92a is arranged in the Z1 direction and extends to a side face 80c, which is a pressured part of the lock control plate 80.

As mentioned above, according to the embodiment, the swing arm 71, the driving spur gear 72, the switching spur gears 73 and 74, the lock control plate 80, and the switching arm 90 constitute the switching mechanism 70 for switching the power transmission path of the motor M.

In the vicinity of the lock control plate 80, a control mechanism 60 is arranged. In the control mechanism 60, a central shaft 61a is fixed on the bottom plate of the lower chassis 4, and in the Z1 direction of the central shaft 61a a two-stage gear 62 is rotatably supported, while in the Z2 direction the control member 61 is rotatably supported. The two-stage gear 62 and the control member 61 can rotate independently of each other. The two-stage gear 62 includes a small spur gear 62a (see FIG. 17) arranged closer to the control member 61 and a large spur gear 62b arranged further away, which are integrally formed.

As shown in FIGS. 12 and 13, the drive gear 50a meshing with the rack 10c of the power transmission member 10 is located between the two-stage gear 62 and the lower chassis 4 and connected to the control member 61 so as to be able to rotate integrally therewith.

As shown in FIG. 16, in a space between the switching spur gear 74 arranged on the swing arm 71 and the two-stage gear 62, a reduction gear train including a pair of two-stage gears 56 and 57 is arranged. One two-stage gear 56 includes a small spur gear 56a and a large gear 56b, which are integrally formed. The small spur gear 56a faces a position where it can mesh with the switching spur gear 74. The other two-stage gear 57 includes a small gear 57a and a large gear 57b, which are integrally formed. The large gear 57b meshes with the small spur gear 56a while the small gear 57a meshes with the large gear 56b of the two-stage gear 62.

Figure 17:
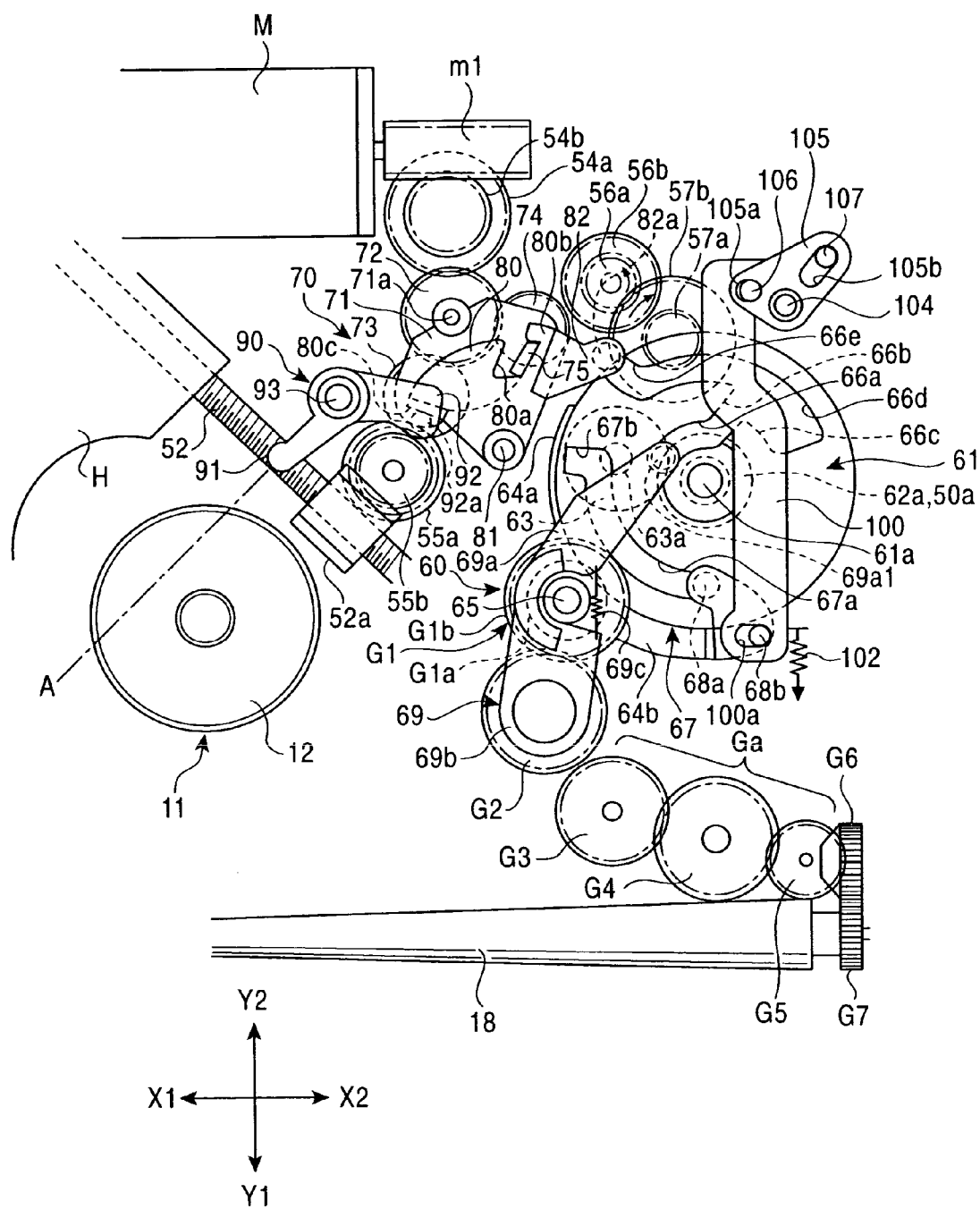
FIG. 17 is a bottom plan view of the switching mechanism of the disk device shown from the rear side showing the disk driving state.

As shown in FIG. 17, the control mechanism 60 is provided with a planetary gear 63 meshing with the small gear 62a. A rotation shaft 63a rotatably supporting the planetary gear 63 is fixed to the control member 61.

As shown in FIG. 16, at a position opposing the outside of the large gear 62b of the two-stage gear 62, a rack member 64 having an internal gear is arranged. The rack member 64 includes a fixed rack 64a, which is a fixed internal gear fixed to the lower chassis 4, and a movable rack 64b, which is a movable internal gear arranged at a position parallel to the fixed rack 64a and rotatable about a shaft 65 fixed to the lower chassis 4 as a fulcrum. The fixed rack 64a is fixed at a position where it meshes with the planetary gear 63 moving around the small gear 62a, while the movable rack 64b can be rotated so as to choose a transmission position where it meshes with the planetary gear 63 or a retracted position where it separates from the planetary gear 63. When the movable rack 64b is located at a position where it can mesh with the planetary gear 63, the internal gear of the fixed rack 64a and the internal gear of the movable rack 64b are positioned on a continuous circular arc.

On the surface of the control member 61 in the Z2 direction, a guide groove 66 is arranged. The guide groove 66 includes a retraction guide path 66a, which is formed along an arc locus about the central shaft 61a and in an inside periphery close to the central shaft 61a, and an operation guide path 66b extending in a direction away from the central shaft 61a and intersecting with one end of the retraction guide path 66a. Also, in the guide groove 66, at a position opposite the operation guide path 66b, a waiting guide path 66c extending along an arc locus about the central shaft 61a is continuously formed.

Furthermore, the guide groove 66 is provided with a lock guide path 66d positioned in an outside periphery away from the central shaft 61a further than the operation guide path 66b and the waiting guide path 66c and extending along an arc locus about the central shaft 61a, and part of the lock guide path 66d faces the waiting guide path 66c. Also, there is provided an introduction guide path 66e extending outward from one end of the lock guide path 66d and leading to the outside of the control member 61 as well.

As shown in FIG. 17, on the surface of the control member 61 in the Z2 direction, another guide groove 67 is formed together with the guide groove 66. The guide groove 67 includes a transmission guide path 67a formed along an arc locus about the central shaft 61a and a retraction guide path 67b extending in a direction away from the central shaft 61a and intersecting with one end of the transmission guide path 67a.

As shown in FIG. 16, at the distal end of the movable rack 64b, an arm 68 extending so as to overlap with the surface of the control member 61 in the Z2 direction is integrally arranged. At an end of the arm 68, a guide projection 68a is formed in the Z1 direction, and the guide projection 68a is inserted into the guide groove 67.

To the shaft 65 supporting the movable rack 64b, a drive arm 69 is rotatably supported. Also, to the shaft 65, a drive gear G1 is rotatably arranged. The drive gear G1 is located between the bottom plate of the lower chassis 4 and the movable rack 64b. As shown in FIG. 17, the drive gear G1 is a two-stage gear having a small gear G1a formed integrally, and the small gear G1a constantly meshes with the large gear 62b of the two-stage gear 62.

The drive arm 69 includes a first arm 69a extending to a position overlapping the surface of the control member 61 in the Z2 direction and a second arm 69b extending toward the roller 9. At an end of the first arm 69a, a guide projection 69a1 is arranged in the Z1 direction and inserted into the guide groove 66. At an end of the second arm 69b, a reduction gear G2 is rotatably supported so as to mesh with a large gear G1b of the drive gear G1.

The first arm 69a and the second arm 69b are structured independently of each other and are rotatably supported by the shaft 65 together. Also, the first arm 69a and the second arm 69b are pulled toward each other with a spring 69c, and are retained so as to be stable at a relative angle shown in FIG. 17. When the drive arm 69 rotates counterclockwise so that the reduction gear G2 is meshed with a reduction gear G3, the meshing pressure thereof is exerted by an elastic force of the spring 69c.

The reduction gear G3 is rotatably supported by a shaft fixed on the bottom plate of the lower chassis 4. The reduction gear G3, reduction gears G4 and G5 meshed with the reduction gear G3, and further the connection gear G6 having a spiral gear form a power transmission unit Ga. At one end of a roller shaft 18a of the roller 18, a gear G7 is fixed. As shown in FIG. 9, if the roller 18 is raised in the Z1 direction to be at the conveying force transmission position, the gear G7 arranged at the roller shaft 18a is meshed with a connection gear G6.

In the lock control plate 80, an arm 82 is integrally formed so as to overlap with a surface of the control member 61 in the Z2 direction. At an end of the arm 82, a guide projection 82a facing in the Z1 direction is fabricated, and the guide projection 82a can be inserted into the guide groove 66.

As shown in FIG. 17, on the arm 68 arranged at the end of the movable rack 64b, a connection projection 68b protruding in the Z2 direction is fabricated. The connection projection 68b is inserted into a connection hole 100a formed at an end of a rack control bar 100 extending in the Y direction. Also, the rack control bar 100 is constantly urged in the Y1 direction by an urging member 102 such as a torsion coil spring.

A shaft 104 is fixed on the bottom surface of the lower chassis 4, and a small arm 105 is rotatably supported by the shaft 104. A connection shaft 106 arranged at the end of the rack control bar 100 in the Y2 direction is inserted into a connection hole 105a formed in the small arm 105.

As shown in FIG. 2, a pair of positioning arms 108 and 109 are rotatably provided at both sides of the top plate 5e of the upper chassis 5. At an end of the positioning arm 108, there is provided a positioning pin 111 extending in the Z2 direction while at an end of the positioning arm 109, there is provided a positioning pin 112 extending in the Z2 direction, and the positioning pins 111 and 112 extend to a transfer route of the disk D in the mechanism unit 2.

When the disk D is not being conveyed, the positioning arms 108 and 109 are urged by a spring so as to come close to each other. If the disk D is conveyed in the Y2 direction by the roller 18, the positioning pins 111 and 112 are pushed by the external periphery of the disk D so that the positioning arms 108 and 109 are rotated so as to separate from each other. When the opposing space between the positioning arms 108 and 109 is increased to a maximum, the disk D is positioned so that the central hole of the disk D abutting the positioning pins 111 and 112 corresponds with the center of the turntable 13.

Figure 18:
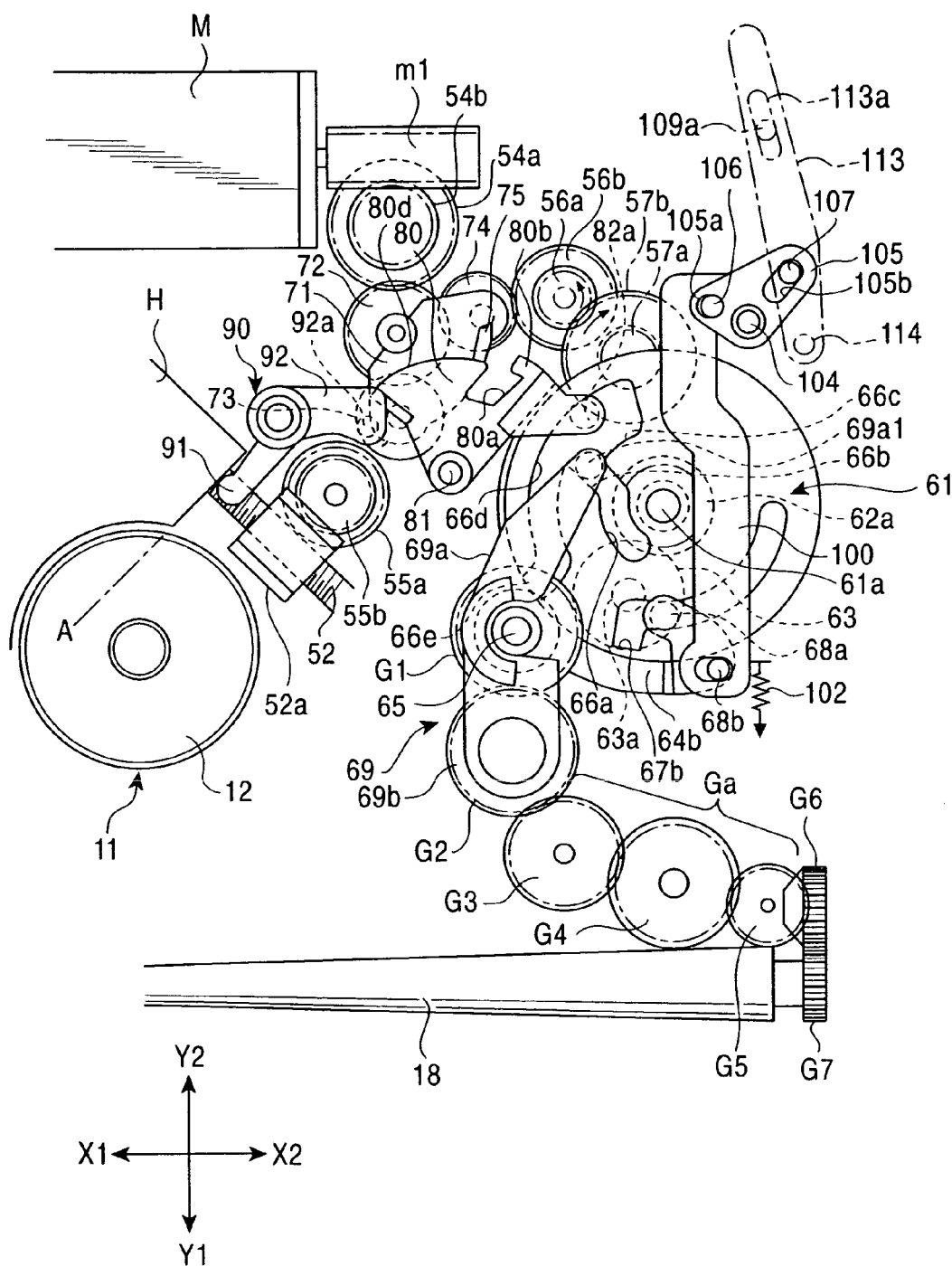
FIG. 18 is a bottom plan view of the switching mechanism of the disk device shown from the rear side showing a state immediately before disk conveying.

As shown in FIG. 18, in the mechanism unit 2, there is provided a trigger arm 113 rotated by one positioning arm 109. The trigger arm 113 is rotated about a shaft 114 as a fulcrum. An elongated hole 113a is formed in the trigger arm 113, and a pin 109a of the positioning arm 109 is slidably inserted into the elongated hole 113a. A trigger pin 107 is attached to the trigger arm 113, and is slidably inserted into an elongated hole 105b formed in the small arm 105.

Figure 19:
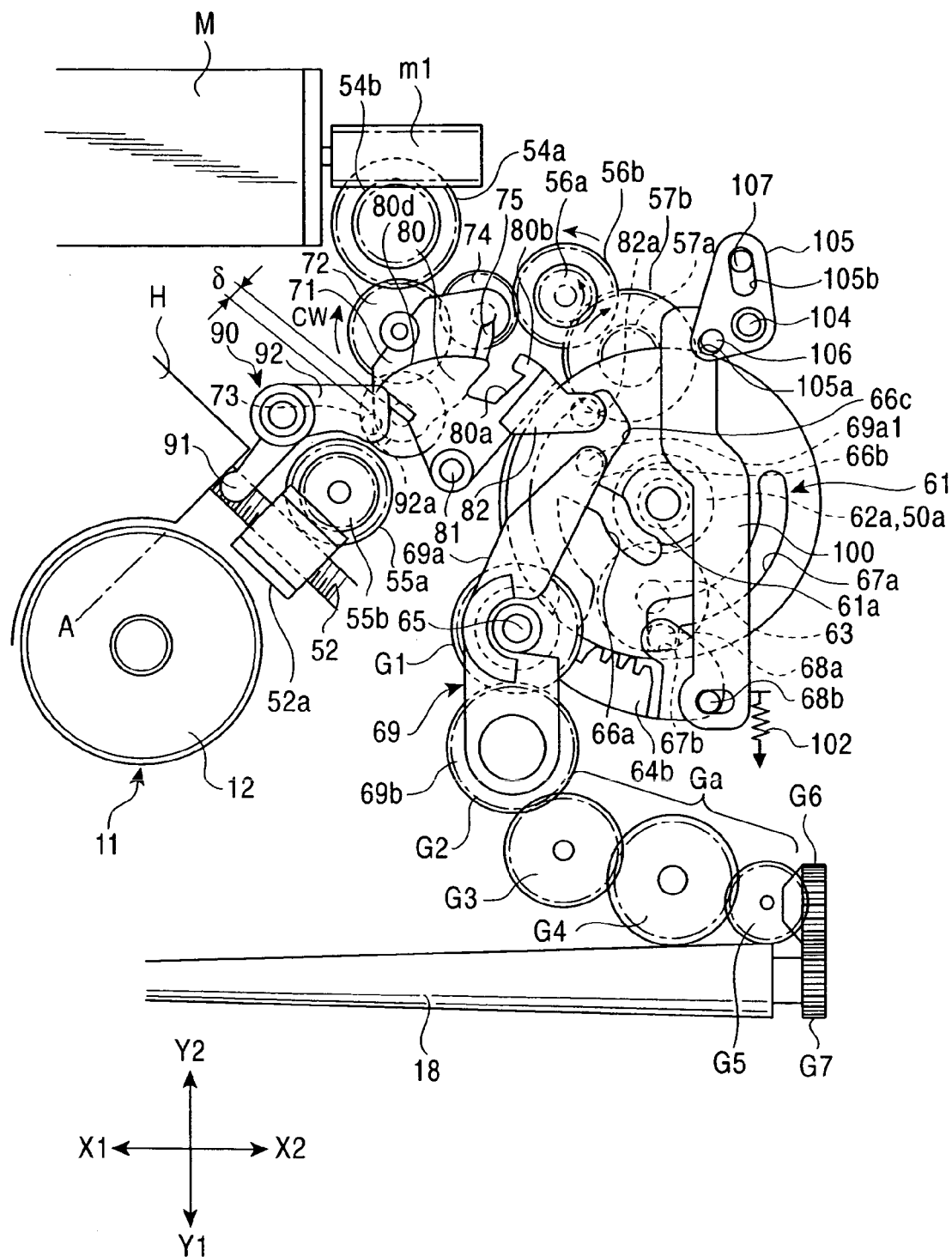
FIG. 19 is a bottom plan view of the switching mechanism of the disk device shown from the rear side showing the disk conveying state.

In a state that the disk D is not mounted, the positioning arms 108 and 109 are rotated so as to come close to each other, and the trigger arm 113 rotates counterclockwise viewed from the backside of the lower chassis 4, so that the small arm 105, as shown in FIG. 19, is rotated counterclockwise by the trigger arm 113. Since the positioning arms 108 and 109 are rotated so as to separate from each other if the disk D is conveyed, the trigger arm 113 is rotated clockwise viewed from the backside of the lower chassis 4, so that the small arm 105, as shown in FIGS. 17 and 18, is rotated clockwise.

Next, the operation of the disk device 1 will be described.

(Disk Driving State)

FIGS. 7 and 8 show a state that the disk D is mounted in the rotational drive unit 11 and reproducing or recording processing is performed thereon.

In this state, since the power transmission member 10 shown in FIGS. 13 and 15 is moved in the Y1 direction, as shown in FIG. 7, the connection member 20 is rotated counterclockwise, and the guide projection 21 is positioned at the end in the Y1 direction of the guide hole 33 formed in the clamp chassis 6. Therefore, the clamp chassis 6 is rotated counterclockwise about the projection 4e inserted into the support hole 32a as a fulcrum.

As mentioned above, the clamp arm 35 supporting the damper 36 is pushed onto the upper surface of the clamp chassis 6 by an urging force of the elastic member 37 such as a torsion spring. Furthermore, the upper surface is located at a position further in the Y2 direction than the projection 4e, which is a rotational fulcrum. Therefore, if the clamp chassis 6 rotates counterclockwise, the clamp arm 35 comes close to the lower chassis 4, so that the damper 36 is pushed onto the disk D on the turntable 13 while being subjected to the urging force of the elastic member 37 so as to clamp the disk D with the damper 36 and the turntable 13.

Since the connection holes 14g and 15g of the attitude set-up members 14 and 15 and the connection holes 30a and 31a at the ends of the arms 30 and 31 of the clamp chassis 6 are connected together with connection pins (not shown), if the clamp chassis 6 is rotated counterclockwise as shown in FIG. 7, the attitude set-up members 14 and 15 are rotated clockwise about the shaft 4c as a fulcrum. Then, the fitting part 14e of the attitude set-up member 14 is fitted into the notch 22a of the fitting piece 22 arranged in the upper chassis 5.

By the clockwise rotation of the attitude set-up members 14 and 15, the rotary arms 17a and 17b connected to the attitude set-up members 14 and 15, as shown in FIG. 7, are rotated counterclockwise about the axial projections 17a1 and 17b1 as fulcrums, respectively. Therefore, the disk device 1 is at a retracting position where the roller 18 supported by the rotary arms 17a and 17b is separated from the disk D.

In the state shown in FIGS. 7 and 8, the entire mechanism unit 2 including the clamp chassis 6 and the attitude set-up members 14 and 15 does not abut any of the internal surfaces of the external chassis 3 and is elastically supported within the external chassis 3 by the elastic support members 40a, 40b, and 40c.

In the reproducing or recording operation, as shown in FIG. 17, the control member 61 is rotated clockwise and the optical head H moves to a region where it does not abut the input arm 91. Therefore, the lock control plate 80 is rotated counterclockwise by an urging force of a spring (not shown) so that the pressure projection 92a is pushed by the side face 80c of the lock control plate 80, and the switching arm 90 is rotated clockwise. Also, the lock projection 75 of the swing arm 71 is located within the lock recess 80a fabricated in the lock control plate 80 and is held so as not to come off by the restriction piece 80b. As a result, the swing arm 71 maintains the clockwise-rotated state shown in FIG. 17, and the switching spur gear 73, as shown in FIG. 13, meshes with the large spur gear 55a of the two-stage gear 55. The other switching spur gear 74 is separated from the large gear 56b.

Accordingly, the power from the motor M is transmitted to the worm wheel 52a via the two-stage gear 54, the driving spur gear 72, the switching spur gear 73, and the two-stage gear 55 so as to rotate the screw shaft 52. By the rotational force of the screw shaft 52, the optical head H is moved in directions approaching or separating from the rotational drive unit 11, i.e., in the radial direction of the disk D. Then, by the spindle motor 12, the disk D is rotated and the optical head H is moved in the radial direction of the disk D so as to perform the recording on the disk D or the reproducing therefrom. In the recording or reproducing operation, by a laser focused by the objective lens arranged in the optical head H, the recording region of the disk D is scanned. However, during the movement of the optical head H within the scanning region, the optical head H does not abut the input arm 91 of the switching arm 90.

Since the power from the motor M is not transmitted to the large gear 56b of the two-stage gear 56, the power is not transmitted to the two-stage gear 57, the two-stage gear 62, and the drive gear 50a, so that the power transmission member 10 remains located in the Y1 direction. Therefore, the connection member 20 remains in the counterclockwise-rotated state as shown in FIG. 7.

(Disk Discharge Operation)

When the disk D is discharged upon completion of the reproducing or recording operation of the disk D, the optical head H is moved by the motor M toward the internal periphery. At this time, the optical head H is moved to a movement-limit position A in the internal peripheral side shown in FIG. 18, which is closer to the internal periphery of the disk D than the movement region for the reproducing or recording operation.

In the reproducing or recording operation shown in FIG. 17, the end of the input arm 91 is located at a position protruding closer to the optical head H than movement-limit position A; however, if the optical head H moves to the movement-limit position A as mentioned above, by the head base Hb of the optical head H, the input arm 91 is urged so that the switching arm 90 is rotated counterclockwise.

As shown in FIG. 18, if the switching arm 90 is rotated counterclockwise, by the pressure projection 92a of the output arm 92, the side face 80c of the lock control plate 80 is pushed so that the lock control plate 80 is rotated clockwise.

First, the restriction piece 80b of the lock control plate 80 comes off the lock projection 75 of the swing arm 71, so that the restriction of the lock projection 75 by the lock recess 80a is cancelled. Then, the driving spur gear 72 is rotated counterclockwise while the switching gear 73 is rotated clockwise by the motor M. Therefore, by the reaction of the force of the switching gear 73 applied to teeth of the large gear 55a, the swing arm 71, of which restriction is cancelled, is rotated counterclockwise, so that the switching gear 73 is separated from the large gear 55a while the other switching gear 74 is meshed with the large gear 56b of the two-stage gear 56. At this time, the lock projection 75 of the swing arm 71 exits from the lock recess 80a so that the switching gear 74 meshes with the large gear 56b.

Then, the power of the motor M is transmitted from the driving spur gear 72 to the two-stage gears 56 and 57 through the switching gear 74. The power is further transmitted from the small gear 57a of the two-stage gear 57 to the large gear 62b of the two-stage gear 62 so as to rotate the large gear 62b counterclockwise. Since the small gear 62a rotating together with the large gear 62b is meshed with the planetary gear 63, the planetary gear 63 rotates clockwise. Also, since the planetary gear 63 rotates in the meshed state with the fixed rack 64a, the control member 61, which is integral with the rotation shaft 63a of the planetary gear 63, is rotated counterclockwise.

If the control member 61 starts operating in the counterclockwise direction, the guide projection 82a arranged in the arm 82, which is integral with the lock control plate 80, is brought in the lock guide path 66d from the introduction guide path 66e of the guide groove 66 formed in the control member 61. By this guide operation, the lock control plate 80 is further rotated clockwise and the lock projection 75 runs upon a curved surface 80d of the lock control plate 80 so that the lock projection 75 is restricted not to return to the lock recess 80a. Therefore, the swing arm 71 is restricted not to rotate clockwise. Then, during the counterclockwise-rotation of the control member 61, the guide projection 82a is guided along the lock guide path 66d while swinging. However, since the radius of the lock guide path 66d about the central shaft 61a is a predetermined arc locus, the lock control plate 80 maintains the clockwise-rotated state and the switching gear 74 and the large gear 56b maintain the meshed state with each other.

If the control member 61 is rotated counterclockwise, the drive gear 50a integral with the control member 61 is also rotated counterclockwise. When the drive gear 50a is rotated counterclockwise, the power transmission member 10 shown in FIGS. 13 and 15 is moved in the Y2 direction. By the elongated hole 10d of the power transmission member 10, the connection member 20 is rotated clockwise. Movement of the guide hole 33 of the clamp chassis 6 from the Y1 to the Y2 direction rotates the clamp chassis 6 clockwise about the projection 4e as a fulcrum.

Figure 6:
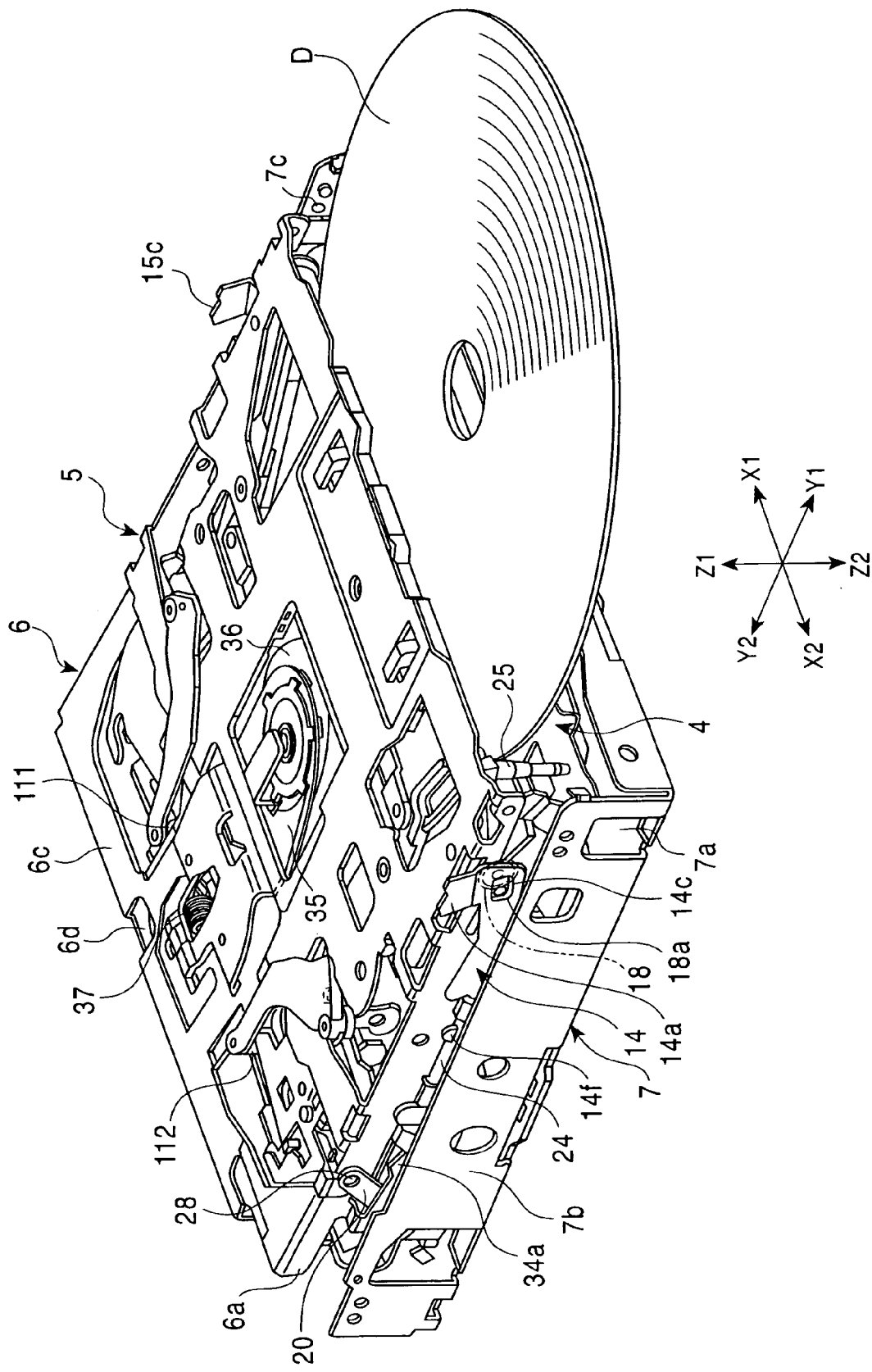
FIG. 6 is a perspective view of the disk device in a stand-by state.

If the clamp chassis 6 is rotated clockwise, as shown in FIGS. 6 and 10, the rear end 6c of the clamp chassis 6 is raised in the Z1 direction so as to abut the internal surface of the upper base 8. Since the abutment part 35a of the clamp arm 35 located at a position closer than the rotational fulcrum of the clamp arm 35 in the rear direction (Y2 direction) is abutted to the internal surface (lower surface) of the fixed piece 9h of the upper base 8, the clamp arm 35 is rotated counterclockwise about the rotational fulcrum part 35b so that the damper 36 is upwardly separated from the disk D on the turntable 13. Therefore, the clamping of the disk D is cancelled.

If the clamp chassis 6 is rotated clockwise, the attitude set-up members 14 and 15 connected to the clamp chassis 6 through the connection pin 110 are rotated counterclockwise about the shaft 4c as a fulcrum. By this operation, the mechanism unit 2 is restrained so as not to move within the external chassis.

In this restraining operation, first, as shown in FIGS. 9 and 10, the clamp chassis 6 is rotated clockwise so that the rear end 6c abuts the internal surface of the upper base 8, thereby restricting the upward movement of the mechanism unit 2. Furthermore, both side faces of the rear end 6c of the clamp chassis 6 are clamped between the support piece 9c and the support piece 9d (also shown in FIG. 5), so that the movement of the mechanism unit 2 in the X direction is restricted. Moreover, the support pieces 9e and 9f of the upper base 8 are inserted into the notches 6d and 6e formed on the upper surface of the clamp chassis 6, and the support piece 9g is further inserted into the notch 6f of the clamp chassis 6. Accordingly, the rear end 6c of the clamp chassis 6 is clamped with the support pieces 9e and 9f and the support piece 9g, so that the movement of the mechanism unit 2 in the Y direction is restricted.

Also, as shown in FIG. 9, if the attitude set-up member 14 is rotated counterclockwise, the abutment piece 14a at the end in the Y1 direction abuts the internal surface 8a of the upper base 8 and the abutment piece 14b in the Y2 direction abuts the bottom plate 7a of the lower base 7, thereby restricting the movement of the mechanism unit 2 in the Z direction, which is the vertical direction. In addition, also by the attitude set-up member 15, the movement of the mechanism unit 2 in the Z direction is restricted in the same way. At this time, by the intervention of part of the abutment pieces 14a and 15a inside the support pieces 9a and 9b fabricated in the upper base 8 by bending, the mechanism unit 2 is restricted through the attitude set-up members 14 and 15 so as not also to move in the X direction.

In such a manner, by the respective abutments of the clamp chassis 6 and the attitude set-up members 14 and 15 to the lower base 7 and the upper base 8, the entire mechanism unit 2 having the rotational drive unit 11 is restricted from moving in any direction including the X, Y, and Z directions.

Also, as shown in FIG. 10, if the clamp chassis 6 is rotated clockwise, the rotary arms 17a and 17b are rotated clockwise through the attitude set-up members 14 and 15 so as to raise the roller 18 supported by the rotary arms 17a and 17b to be abutted to the bottom surface of the disk D, enabling the force conveying the disk D to be transmitted from the roller 18.

In the process that the control member 61 rotates from the position shown in FIG. 17 to the position shown in FIG. 18, the guide projection 69a1 arranged in the first arm 69a of the drive arm 69, as shown in FIG. 17, is located in the retraction guide path 66a at first. Since the retraction guide path 66a is positioned on a circular arc locus about the central shaft 61a, during the counterclockwise rotation of the control member 61, the drive arm 69 is not rotated, leaving the reduction gear G2 to be separated from the reduction gear G3. However, if the control member 61 is rotated counterclockwise to the position shown in FIG. 18, the guide projection 69a1 is brought in the operation guide path 66b from the retraction guide path 66a, so that the drive arm 69 is rotated counterclockwise by the operation guide path 66b.

Therefore, the reduction gear G2 arranged in the second arm 69b is meshed with the reduction gear G3 of the power transmission unit Ga.

Then, the rotational force of the large gear 62b is transmitted to the connection gear G6 from the drive gear G1 through the power transmission unit Ga. Moreover, the power is transmitted to the gear G7 meshed with the connection gear G6 at this time so as to rotate the roller 18, which is raised to a position where the roller 18 abuts the disk D, in the disk discharging direction. Therefore, the disk D released from clamping is conveyed toward an insertion hole of a casing by the rotational force of the roller 18.

Also, if the control member 61 rotates to the position shown in FIG. 18, the planetary gear 63 comes off the fixed rack 64a. However, at this time, the guide projection 68a arranged at the end of the movable rack 64b is located within the transmission guide path 67a of the guide groove 67. Since the transmission guide path 67a is positioned on a circular arc locus about the central shaft 61a, the movable rack 64b is positioned on the same circular arc as for the fixed rack 64a. Therefore, the planetary gear 63 is rotated counterclockwise while meshing with the movable rack 64b after coming off the fixed rack 64a.

Meanwhile, the guide projection 82a arranged in the lock control plate 80 is moved to the end of the lock guide path 66d. Also, the guide projection 69a1 arranged in the drive arm 69 comes off the operation guide path 66b so as to be moved to the waiting guide path 66c. Since the waiting guide path 66c is positioned on a circular arc locus about the central shaft 61a, the meshing between the reduction gear G2 and the reduction gear G3 of the drive arm 69 is maintained.

If the control member 61 is further rotated counterclockwise from the position shown in FIG. 18, the guide projection 68a arranged in the movable rack 64b moves at a position opposing the retraction guide path 67b at the terminal end of the guide groove 67. At this time, since the disk D is moved in the Y2 direction to some extent of distance by the rotational force of the roller 18 driven by the motor M, the external periphery of the disk D is separated from the positioning pin 112, and the positioning arm 109 is rotatable clockwise in FIG. 2. Therefore, the trigger arm 113 linking with the positioning arm 109 is also rotatable counterclockwise in FIG. 18, and the small arm 105 connected to the trigger arm 113 through the trigger pin 107 is also rotatable counterclockwise. Also, the rack control bar 100 urged by the urging member 102 is also rotatable in the Y1 direction.

Accordingly, as shown in FIG. 19, the guide projection 68a enters the retraction guide path 67b by the urging force of the urging member 102, so that the control member 61 is locked so as not to rotate at its position. Also, by the rack control bar 100, the movable rack 64b is rotated to a position where the movable rack 64b is separated from the planetary gear 63. Therefore, when the large gear 62b is rotated thereafter, the planetary gear 63 meshing with the small gear 62a only rotates on its axis while stopping at its position.

If the control member 61 is locked in such a manner, the power transmission member 10 is also locked without moving at the position shown in FIG. 14 because the drive gear 50a stops. Therefore, the clamp chassis 6, the attitude set-up members 14 and 15, and the rotary arms 17a and 17b maintain the state shown in FIG. 9. Accordingly, the roller 18 stops at the conveying-force transmission position where it abuts the disk D.

Even after the control member 61 is locked, as shown in FIG. 19, the two-stage gear 62 can be driven by the power of the motor M. As the control member 61 is locked in FIG. 19, the reduction gears G2 and G3 are maintained in the state of meshing with each other by the drive arm 69. Therefore, if the motor M is driven, the power thereof is transmitted to the roller 18 from the two-stage gear 62 through the power transmission unit Ga. Accordingly, only the roller 18 is driven while the entire mechanism maintains the state shown in FIG. 9, enabling the disk D to be conveyed toward the insertion hole.

(Disk Mounting Operation)

A stand-by state that the disk D is discharged is shown in FIG. 6. At this time, as shown in FIGS. 9 and 10, the clamp chassis 6 and the attitude set-up members 14 and 15 are rotated in opposite directions to each other so that the mechanism unit 2 is locked within the external chassis 3. Also, at this time, a space is formed for introducing the disk D on the turntable 13 from the insertion hole. The roller 18 can abut the disk D and is located at a position where it can convey the disk D, so that the power of the motor M can be transmitted only to the roller 18 through the two-stage gear 62.

In the stand-by state, as shown in FIG. 19, the guide projection 82a of the lock control plate 80 is held in the lock guide path 66d, and the lock control plate 80 is rotated clockwise. Also, the optical head H moves to the movement-limit position A and the switching arm 90 is rotated clockwise; at this time, between the output arm 92 of the switching arm 90 and the side face 80c of the lock control plate 80, a gap δ is formed.

If it is detected that the disk D is inserted into the insertion hole, the motor M is started. As a means for detecting the insertion of the disk D, there is provided a pair of detection pins 25 (see FIG. 1) arranged adjacent to the insertion hole (in the Y1 direction) in the mechanism unit 2. The space between the detection pins 25 is set smaller than the diameter of the disk D. If the disk D abuts these detection pins 25 so as to increase the space therebetween, the insertion of the disk D into the disk device 1 is detected.

Upon detecting the insertion of the disk D, the motor M is started so as to drive the driving spur gear 72 by the power thereof; the rotational direction at this time of the driving spur gear 72 is clockwise (CW) in FIG. 19. This rotational force is transmitted to the large gear 62b of the control mechanism 60 from the switching spur gear 74 through the two-stage gears 56 and 57 so as to rotate the large gear 62b clockwise. The power of the large gear 62b is transmitted to the gear G7 from the drive gear G1 through the power transmission unit Ga so as to drive the roller 18 in a direction conveying the disk D.

By the rotational force of the roller 18, the disk D is fed into the mechanism unit 2 in the disk device 1. The external periphery of the disk D fed thereinto abuts the positioning pins 111 and 112 located at the position shown in FIG. 6 so as to push them in the Y2 direction by the transferring force of the disk D, so that the positioning arm 108 is rotated clockwise while the positioning arm 109 is rotated counterclockwise. Then, when the central hole of the disk D coincides with the turntable 13 of the rotational drive unit 11, the positioning arms 108 and 109 are rotated to the terminal position in directions separating from each other, thereby positioning the disk D in the state that the disk D coincides with the turntable 13.

As shown in FIG. 2, if the positioning arm 109 is rotated counterclockwise to the terminal position so as to position the disk D as mentioned above, the trigger arm 113 is rotated clockwise in FIG. 18, so that the small arm 105 connected to the trigger arm 113 through the trigger pin 107 is rotated clockwise from the state shown in FIG. 19 to the state shown in FIG. 18.

When the small arm 105 is rotated clockwise, the rack control bar 100 is moved in the Y2 direction, and the movable rack 64b is rotated counterclockwise so as to mesh with the planetary gear 63. Also, the guide projection 68a comes off the retraction guide path 67b, so that the control member 61 is unlocked. Since the large gear 62b is rotated clockwise as mentioned above so that the small gear 62a is rotated clockwise along with the large gear 62b and the planetary gear 63 rotated counterclockwise, the control member 61 is rotated clockwise when the planetary gear 63 is meshed with the movable rack 64b.

The operation at this time is reversing from the state shown in FIG. 19 to the state shown in FIG. 17. In the clockwise rotational operation of the control member 61, the guide projection 68a arranged in the movable rack 64b is located in the transmission guide path 67a, so that the movable rack 64b maintains the state meshing with the planetary gear 63.

During the rotation of the control member 61 from the state shown in FIG. 18 to the state shown in FIG. 17, the guide projection 69a1 disposed in the drive arm 69 moves to the retraction guide path 66a from the waiting guide path 66c through the operation guide path 66b. Meanwhile, the drive arm 69 rotates clockwise and the reduction gear G2 is separated from the reduction gear G3, so that the rotational force from the large gear 62b is stopped from transmission to the roller 18 so as to stop the roller 18.

As the control member 61 rotates clockwise, the drive gear 50a rotates clockwise along therewith so as to drive the power transmission member 10 in the Y1 direction. Therefore, as shown in FIG. 7, the connection member 20 is rotated counterclockwise by the power transmission member 10, so that the clamp chassis 6 is separated downwardly separated from the internal surface 8a of the upper base 8. Along therewith, the abutment part 35a of the clamp arm 35 is separated from the fixing piece 9h of the upper base 8, so that the clamp arm 35 rotates clockwise. Therefore, by the urging force of the damper 36, the disk D is clamped to the turntable 13.

Also, by the rotational force of the clamp chassis 6, the attitude set-up members 14 and 15 are rotated clockwise so that the roller 18 is separated from the disk D, as shown in FIG. 7. The rotation of the clamp chassis 6 and the attitude set-up members 14 and 15 in directions opposite to each other cancels the locking between the mechanism unit 2 and the external chassis 3, so that the mechanism unit 2 is elastically floated by the elastic support members 40a, 40b, and 40c within the external chassis 3.

If the control member 61 is further rotated clockwise from the position shown in FIG. 18, the guide projection 82a disposed on the lock control plate 80 is guided from the lock guide path 66d to the introduction guide path 66e. By the guiding force at this time, the lock control plate 80 is slightly rotated counterclockwise, so that the curved surface 80d of the lock control plate 80 is separated from the lock projection 75 of the swing arm 71, releasing the restriction of the swing arm 71.

The planetary gear 63 is meshed with the fixed rack 64a at this time, and since the diameter of the large gear 62b is large and is further meshed with the two-stage gears 56 and 57, the load of the two-stage gear 56 is large. Therefore, by the reaction force applied to the two-stage gear 56 of the switching spur gear 74 rotating counterclockwise, the swing arm 71 is rotated clockwise. By the rotation of the swing arm 71, the lock projection 75 enters the lock recess 80a of the lock control plate 80 while the switching spur gear 74 is separated from the two-stage gear 56 so that the other switching gear 73 is meshed with the large gear 55a of the two-stage gear 55. The side face 80c of the lock control plate 80 abuts the pressure projection 92a of the switching arm 90 at this time.

Thereby, the power of the motor M is transmitted to the two-stage gear 55 from the driving spur gear 72 through the switching gear 73, and the screw shaft 52 is further driven by the small gear 52a so as to move the optical head H in a direction separating from the rotational drive unit 11. At this time, the switching arm 90 is in a free state. Therefore, the lock control plate 80 urged clockwise by a spring rotates counterclockwise so that, as shown in FIG. 17, the guide projection 82a comes off the introduction guide path 66e while the restriction piece 80b of the lock control plate 80 is brought into engagement with the lock projection 75 and the lock projection 75 is held within the lock recess 80a, holding the swing arm 71 in a state rotating clockwise.

Thereafter, the power of the motor M is applied to the screw shaft 52 so as to move the optical head H, performing a reproducing or recording operation.

According to the embodiment, the clamp mechanism is exemplified in which the clamp chassis 6 is attached to the upper chassis 5, and in the clamp chassis 6, the clamp arm 35 supporting the damper 36 is further connected in a movable state. Alternatively, a structure may be possible, for example, in which the upper chassis 5 is movably connected to the lower chassis 4, and the clamp arm 35 is movably supported to the upper chassis 5 while the upper chassis 5 is directly connected to the attitude set-up members 14 and 15 so as to perform clamping/unclamping operation of the disk D by the movement of the upper chassis 5. By such a structure, the clamp chassis 6 can be eliminated, reducing the cost.

Also, according to the embodiment, the clamp chassis 6 is first rotated by the power of the motor M, and the attitude set-up members 14 and 15 are rotated by the rotational force of the clamp chassis 6. Alternatively, the attitude set-up members 14 and 15 can be directly rotated by the power of the motor M, and then the clamp mechanism such as the clamp chassis 6 may be driven by the rotational force of the attitude set-up members 14 and 15.

What is claimed is:

1. A disk device comprising a mechanism unit, comprising:
    a rotational drive unit for driving a disk;
    a clamp mechanism for clamping the disk to the rotational drive unit; and
    a conveying mechanism for conveying the disk toward the rotational drive unit, wherein the mechanism unit comprises an attitude set-up member, which is connected to the clamp mechanism and the conveying mechanism and rotates about an axis parallel to the surface of the disk mounted in the mechanism unit, and a drive mechanism for applying a rotational force to the attitude set-up member,
    wherein when the attitude set-up member rotates in a predetermined direction, the clamp mechanism is operated to cancel the clamping of the disk, and the conveying mechanism is set to be able to convey the disk by the rotational force of the attitude set-up member, and
    wherein when the attitude set-up member rotates in a direction opposite to the predetermined direction, the clamp mechanism is set to clamp the disk, and the conveying mechanism is set not to apply a conveying force to the disk by the rotational force of the attitude set-up member,
    wherein the clamp mechanism comprises a clamp chassis for rotational operation, and
    wherein by the power of the drive mechanism, the clamp chassis is rotationally driven while the attitude set-up member is rotated by the rotational force of the clamp chassis.

2. A device according to claim 1, wherein two attitude set-up members are provided, one on each side of the mechanism unit, and both attitude set-up members are connected together with the clamp mechanism therebetween.

3. A device according to claim 1, wherein the conveying mechanism is driven by the power of a motor for driving the drive mechanism.

4. A device according to claim 1, wherein the conveying mechanism comprises a roller for applying a conveying force to the disk and an arm for rotatably supporting the roller, and
    wherein by the rotational force of the attitude set-up member, the arm is rotated, so that the roller is moved to one of a position where the roller contacts the disk and a position where the roller is separated from the disk.

5. A device according to claim 1, wherein the clamp chassis is provided with a rotatable clamp arm and having a damper rotatably attached to the clamp arm for clamping the disk to the rotational drive unit, and
    wherein the clamp arm rotates in clamping/unclamping directions along with the rotation of the clamp chassis.

6. A device according to claim 1, wherein the mechanism unit is supported within an external chassis with an elastic support member therebetween, and
    wherein when the attitude set-up member rotates in the predetermined direction, by the abutment of the attitude set-up member to the external chassis, the movement of the mechanism unit is restricted so as not to move within the external chassis, while when the attitude set-up member rotates in a direction opposite to the predetermined direction, the attitude set-up member is separated from the external chassis, so that the mechanism unit is elastically supported by the elastic support member within the external chassis.

7. A device according to claim 6, wherein when the attitude set-up member rotates in the predetermined direction, the clamp mechanism abuts the external chassis at a position different from the position where the attitude set-up member abuts.

8. A disk device comprising a mechanism unit, comprising:
    a rotational drive unit for driving a disk;
    a clamp mechanism for clamping the disk to the rotational drive unit;
    a conveying mechanism for conveying the disk toward the rotational drive unit;
    an optical head opposing the disk clamped to the rotational drive unit; and
    a head-transfer mechanism for moving the optical head in the radial direction of the disk,
    wherein the mechanism unit comprises an attitude set-up member, which is connected to the clamp mechanism and the conveying mechanism and rotates about an axis parallel to the surface of the disk mounted in the mechanism unit, and a drive mechanism for applying a rotational force to the attitude set-up member, wherein when the attitude set-up member rotates in a predetermined direction, the clamp mechanism is operated to cancel the clamping of the disk, and the conveying mechanism is set to be able to convey the disk by the rotational force of the attitude set-up member, wherein when the attitude set-up member rotates in a direction opposite to the predetermined direction, the clamp mechanism is set to clamp the disk, and the conveying mechanism is set not to apply a conveying force to the disk by the rotational force of the attitude set-up member, wherein the mechanism unit is supported within an external chassis with an elastic support member therebetween, and wherein when the attitude set-up member rotates in the predetermined direction, by the abutment of the attitude set-up member to the external chassis, the movement of the mechanism unit is restricted so as not to move within the external chassis, while when the attitude set-up member rotates in a direction opposite to the predetermined direction, the attitude set-up member is separated from the external chassis, so that the mechanism unit is elastically supported by the elastic support member within the external chassis.

9. A device according to claim 8, wherein the attitude set-up member includes two sides, the center of rotation of the attitude set-up member is located between the two sides, one side of the attitude set-up member is directly connected to the clamp mechanism, and the other side is directly connected to the conveying mechanism.

10. A device according to claim 8, wherein two attitude set-up members are provided, one on each side of the mechanism unit, and both attitude set-up members are connected together with the clamp mechanism therebetween.

11. A device according to claim 8, wherein any one of the conveying mechanism and the head-transfer mechanism is driven by the power of a motor for driving the drive mechanism, and wherein the mechanism unit comprises a switching mechanism for selectively transmitting the motor power to the conveying mechanism or to the head-transfer mechanism.

12. A device according to claim 8, wherein the conveying mechanism comprises a roller for applying a conveying force to the disk and an arm for rotatably supporting the roller, and wherein by the rotational force of the attitude set-up member, the arm is rotated, so that the roller is moved to one of a position where the roller contacts the disk and a position where the roller is separated from the disk.

13. A device according to claim 8, wherein the clamp mechanism comprises a clamp chassis for rotational operation, and wherein by the power of the drive mechanism, the clamp chassis is rotationally driven while the attitude set-up member is rotated by the rotational force of the clamp chassis.

14. A device according to claim 13, wherein the clamp chassis is provided with a rotatable clamp arm and having a damper rotatably attached to the clamp arm for clamping the disk to the rotational drive unit, and wherein the clamp arm rotates in clamping/unclamping directions along the rotation of the clamp chassis.

15. A device according to claim 8, wherein when the attitude set-up member rotates in the predetermined direction, the clamp mechanism abuts the external chassis at a position different from the position to which the attitude set-up member abuts.

16. A disk device comprising a mechanism unit, comprising:
a rotational drive unit for driving a disk;
a clamp mechanism for clamping the disk to the rotational drive unit; and
a conveying mechanism for conveying the disk toward the rotational drive unit,
wherein the mechanism unit comprises an attitude set-up member rotating about an axis parallel to the surface of the disk mounted in the mechanism unit and a drive mechanism for applying a rotational force to the attitude set-up member,
wherein the attitude set-un member includes two sides, the center of rotation of the attitude set-up member is located between the two sides, one side of the attitude set-up member is connected to the clamp mechanisms and the other side is connected to the conveying mechanism,
wherein when the attitude set-up member rotates in a predetermined direction, the clamp mechanism is operated to cancel the clamping of the disk, and the conveying mechanism is set to be able to convey the disk by the rotational force of the attitude set-up member, and
wherein when the attitude set-up member rotates in a direction opposite to the predetermined direction, the clamp mechanism is set to clamp the disk, and the conveying mechanism is set not to apply a conveying force to the disk by the rotational force of the attitude set-up member.

17. A device according to claim 16, wherein an two attitude set-up members are provided, one on each side of the mechanism unit, and both attitude set-up members are connected together with the clamp mechanism therebetween.

18. A device according to claim 16, wherein the conveying mechanism is driven by the power of a motor for driving the drive mechanism.

19. A device according to claim 16, wherein the conveying mechanism comprises a roller for applying a conveying force to the disk and an arm for rotatably supporting the roller, and wherein by the rotational force of the attitude set-up member, the arm is rotated, so that the roller is moved to one of a position where the roller contacts the disk and a position where the roller is separated from the disk.

20. A device according to claim 16, wherein the clamp mechanism comprises a clamp chassis for rotational operation, and wherein by the power of the drive mechanism, the clamp chassis is rotationally driven while the attitude set-up member is rotated by the rotational force of the clamp chassis.

21. A device according to claim 20, wherein the clamp chassis is provided with a rotatable clamp arm and having a damper rotatably attached to the clamp arm for clamping the disk to the rotational drive unit, and wherein the clamp arm rotates in clamping/unclamping directions along with the rotation of the clamp chassis.

22. A device according to claim 16, wherein the mechanism unit is supported within an external chassis with an elastic support member therebetween, and wherein when the attitude set-up member rotates in the predetermined direction, by the abutment of the attitude set-up member to the external chassis, the movement of the mechanism unit is restricted so as not to move within the external chassis, while when the attitude set-up member rotates in a direction opposite to the predetermined direction, the attitude set-up member is separated from the external chassis, so that the mechanism unit is elastically supported by the elastic support member within the external chassis.

23. A device according to claim 22, wherein when the attitude set-up member rotates in the predetermined direction, the clamp mechanism abuts the external chassis at a position different from the position where the attitude set-up member abuts.

* * * * *

UNITED STATES PATENT AND TRADEMARK OFFICE
CERTIFICATE OF CORRECTION

PATENT NO.        : 7,107,603 B2                                         Page 1 of 1
APPLICATION NO.   : 10/674291
DATED             : September 12, 2006
INVENTOR(S)       : Tatuhiko Tuchiya It is certified that error appears in the above-identified patent and that said Letters Patent is hereby corrected as shown below:

<u>In the Claims</u>

Column 19, in claim 1, line 19, delete "and".

Column 20, in claim 5, line 3, before "rotatably attached to the clamp" delete "damper" and substitute --clamper-- in its place.

Column 21, in claim 14, line 3, before "rotatably attached to the clamp" delete "damper" and substitute --clamper-- in its place.

Column 22, in claim 16, line 16, after "to the clamp" delete "mechanisms" and substitute --mechanism,-- in its place.

Column 22, in claim 17, line 1, after "to claim 16, wherein" delete "an".

Column 22, in claim 21, line 3, before "rotatably attached to the clamp" delete "damper" and substitute --clamper-- in its place.

Signed and Sealed this

First Day of May, 2007

JON W. DUDAS
*Director of the United States Patent and Trademark Office*